(12) United States Patent
Harris et al.

(10) Patent No.: US 12,079,814 B2
(45) Date of Patent: Sep. 3, 2024

(54) PRIVACY-PRESERVING GRAPH COMPRESSION WITH AUTOMATED FUZZY VARIABLE DETECTION

(71) Applicant: Visa International Service Association, San Francisco, CA (US)

(72) Inventors: Theodore Harris, San Francisco, CA (US); Tatiana Korolevskaya, Mountain View, CA (US); Yue Li, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 533 days.

(21) Appl. No.: 17/256,945

(22) PCT Filed: Jul. 11, 2019

(86) PCT No.: PCT/US2019/041318
§ 371 (c)(1),
(2) Date: Dec. 29, 2020

(87) PCT Pub. No.: WO2020/014425
PCT Pub. Date: Jan. 16, 2020

(65) Prior Publication Data
US 2021/0272121 A1    Sep. 2, 2021

Related U.S. Application Data

(60) Provisional application No. 62/696,480, filed on Jul. 11, 2018.

(51) Int. Cl.
*G06Q 20/40*    (2012.01)
*G06F 21/62*    (2013.01)
(Continued)

(52) U.S. Cl.
CPC ..... *G06Q 20/4016* (2013.01); *G06F 21/6245* (2013.01); *G06N 3/126* (2013.01);
(Continued)

(58) Field of Classification Search
CPC .. G06Q 20/4016; G06Q 20/382; G06Q 30/06; G06Q 30/02; G06Q 20/4014;
(Continued)

(56) References Cited

U.S. PATENT DOCUMENTS

| 2007/0203732 A1* | 8/2007 | Griegel | G06Q 30/02 |
| | | | 235/379 |
| 2011/0067046 A1* | 3/2011 | Cox | H04N 21/4667 |
| | | | 725/14 |

(Continued)

FOREIGN PATENT DOCUMENTS

| CN | 102929942 A | 2/2013 |
| CN | 105404944 A | 3/2016 |

(Continued)

OTHER PUBLICATIONS

Application No. PCT/US2019/041318, International Search Report and Written Opinion, Mailed On Oct. 25, 2019, 10 pages.

(Continued)

*Primary Examiner* — Hao Fu
(74) *Attorney, Agent, or Firm* — Kilpatrick Townsend & Stockton LLP

(57) ABSTRACT

A disclosed method includes a) receiving by a server computer network data comprising a plurality of transaction data for a plurality of transactions. Each transaction data comprises a plurality of data elements with data values. At least one of the plurality of data elements comprises a user identifier for a user. The server computer can then b) generate one or more graphs comprising a plurality of communities based on the network data. The server com- (Continued)

puter can c) determine fuzzy values for at least some of the data values for each transaction of the plurality of transactions. For each user, the server computer can d) determine fuzzy values for communities within the plurality of communities. The server computer can then e) generate a model using the fuzzy values obtained in steps c) and d), and at least some of the data values.

18 Claims, 8 Drawing Sheets

(51) Int. Cl.
  *G06N 3/126*   (2023.01)
  *G06N 5/048*   (2023.01)
  *G06N 7/02*   (2006.01)
  *G06N 20/10*   (2019.01)
  *G06Q 20/38*   (2012.01)

(52) U.S. Cl.
  CPC ............. *G06N 5/048* (2013.01); *G06N 7/023* (2013.01); *G06N 20/10* (2019.01); *G06Q 20/38* (2013.01)

(58) Field of Classification Search
  CPC ........ G06N 20/10; G06N 3/126; G06N 5/048; G06N 7/023; G06F 21/6245
  See application file for complete search history.

(56) References Cited

U.S. PATENT DOCUMENTS

| | | | |
|---|---|---|---|
| 2013/0138688 A1* | 5/2013 | Anderson | G06N 7/02 707/769 |
| 2015/0156172 A1* | 6/2015 | Nandi | H04L 63/0471 713/153 |
| 2015/0341350 A1* | 11/2015 | Mandal | H04L 63/0838 726/6 |
| 2019/0156061 A1* | 5/2019 | Chakraborty | H04L 63/0421 |

FOREIGN PATENT DOCUMENTS

| | | | | |
|---|---|---|---|---|
| CN | 107590504 A | 1/2018 | | |
| WO | WO-2016137443 A1 * | 9/2016 | | G06N 5/048 |
| WO | 2016175999 | 11/2016 | | |

OTHER PUBLICATIONS

SG11202100165P, "Written Opinion", Oct. 5, 2022, 8 pages.
Notice of Decision to Grant, mailed Aug. 8, 2023, for SG Patent Application No. SG11202100165P, 2 pages.
Office Action, mailed Mar. 29, 2024, Chinese Application No. CN201980046244.4, 17 pages.

* cited by examiner

US 12,079,814 B2

PRIVACY-PRESERVING GRAPH COMPRESSION WITH AUTOMATED FUZZY VARIABLE DETECTION

CROSS-REFERENCES TO RELATED APPLICATIONS

This application is a 371 National Phase of PCT Patent Application No. PCT/US2019/041318 filed Jul. 11, 2019, which claims the benefit of U.S. Provisional Application No. 62/696,480, filed Jul. 11, 2018. The above-named applications are herein incorporated by reference in its their entireties for all purposes.

BACKGROUND

The ability to collect, analyze, and manage massive amounts of information has become widespread today. Machine learning techniques are widely used to produce predictive models for use in medicine, banking, recommendation services, threat analysis, and authentication technologies. Large amounts of data collected over time have enabled new solutions to old problems, and advances in deep learning have led to breakthroughs in speech, image, and text recognition. Large internet companies collect users online activities to train recommender systems that predict their future interest. Health data from different hospitals and government organizations can be used to produce new diagnostic models, while financial companies and payment networks can combine transaction history, merchant data, and account holder information to train more accurate fraud-detection engines. However, data privacy is a concern. With growing privacy concerns across many nations, new improved ways to protect data that is used in machine learning systems and methods are needed.

Embodiments of the invention address these and other problems individually and collectively.

BRIEF SUMMARY

Some embodiments of the invention relate to a method comprising: a) receiving, by a server computer, network data comprising a plurality of transaction data for a plurality of transactions, wherein each transaction data comprises a plurality of data elements with data values, wherein at least one of the plurality of data elements comprises a user identifier for a user; b) generating, by the server computer, one or more graphs comprising a plurality of communities based on the network data; c) determining, by the server computer, fuzzy values for at least some of the data values for each transaction of the plurality of transactions; d) for each user, determining, by the server computer, fuzzy values for communities within the plurality of communities; and e) generating, by the server computer, a model using the fuzzy values obtained in steps c) and d), and at least some of the data values.

Another embodiment of the invention is directed to a server computer comprising: a processor; a memory; and a computer-readable medium coupled to the processor, the computer-readable medium comprising code executable by the processor for implementing a method comprising: a) receiving network data comprising a plurality of transaction data for a plurality of transactions, wherein each transaction data comprises a plurality of data elements with data values, wherein at least one of the plurality of data elements comprises a user identifier for a user; b) generating one or more graphs comprising a plurality of communities based on the network data; c) determining fuzzy values for at least some of the data values for each transaction of the plurality of transactions; d) for each user, determining fuzzy values for communities within the plurality of communities; and e) generating a model using the fuzzy values obtained in steps c) and d), and at least some of the data values.

Further details regarding embodiments of the invention can be found in the Detailed Description and the Figures.

DETAILED DESCRIPTION OF THE INVENTION

Figure 1:
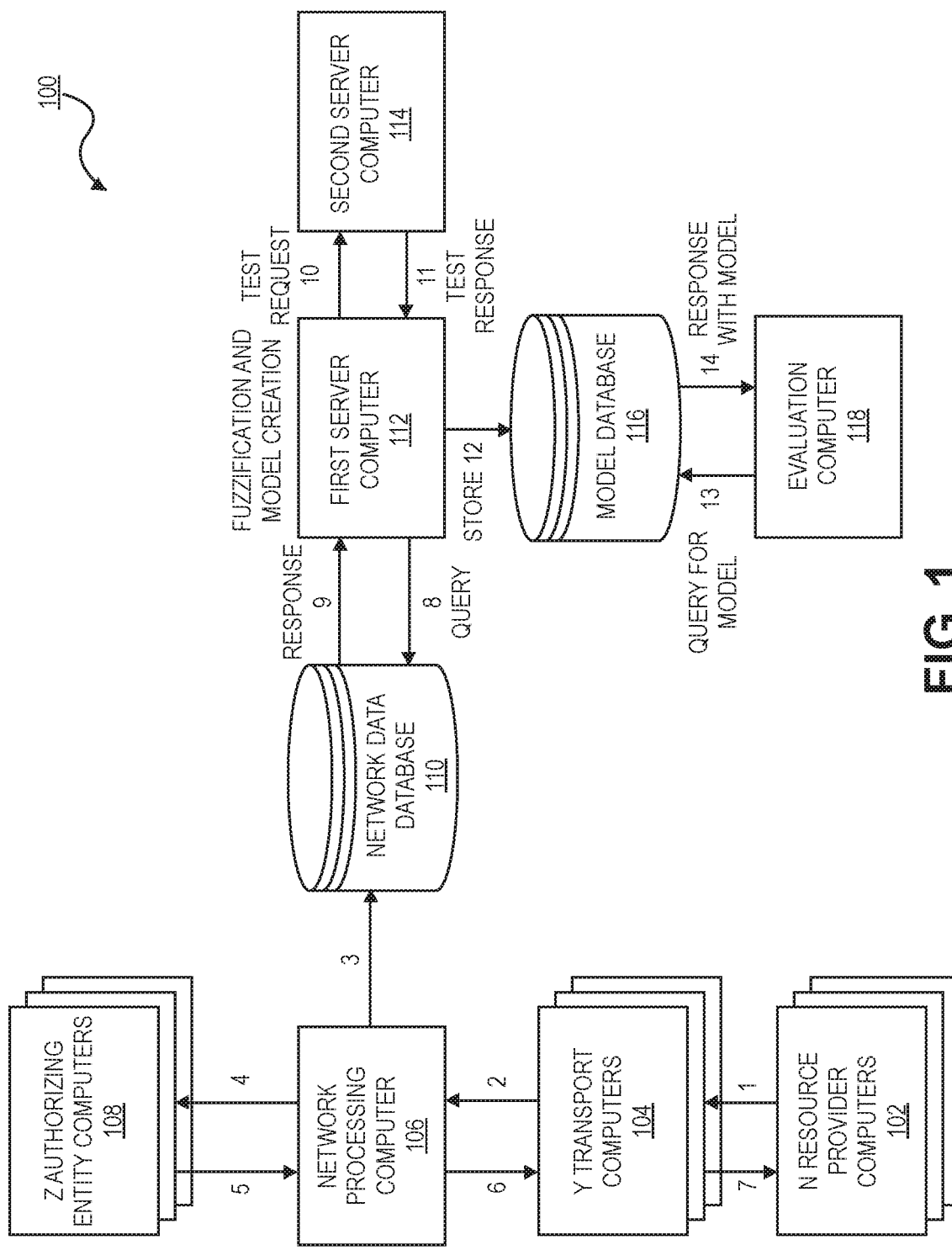
FIG. 1 shows a block diagram of a privacy preserving system according to embodiments.

Prior to discussing embodiments of the invention, some terms can be described in further detail.

The term "artificial intelligence model" or "AI model" can include a model that may be used to predict outcomes in order achieve a pre-defined goal. The AI model may be developed using a learning algorithm, in which training data is classified based on known or inferred patterns. An AI model may also be referred to as a "machine learning model" or "predictive model."

An "adversarial AI" can include a technique which attempts to fool models through malicious input. In some embodiments, an adversarial AI can determine whether or not fuzzy data created by fuzzifying network data is privacy preserving.

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that a consumer might enjoy).

In some embodiments, a model may be a statistical model, which can be used to predict unknown information from known information. For example, a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model has been built from learning module, the model may be used to generate a predicted output from a new request. A new request may be a request for a prediction associated with presented data. For example, a new request may be a request for classifying an image or for creating a recommendation for a user.

A "topological graph" can include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

A "subgraph" or "sub-graph" can include a graph formed from a subset of elements of a larger graph. The elements may include vertices and connecting edges, and the subset may be a set of nodes and edges selected amongst the entire set of nodes and edges for the larger graph. For example, a plurality of subgraphs can be formed by randomly sampling graph data, wherein each of the random samples can be a subgraph. Each subgraph can overlap another subgraph formed from the same larger graph.

A "community" can include a group of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes.

Communities identified using historical data can be used to classify new data for making predictions. For example, identifying communities can be used as part of a machine learning process, in which predictions about information elements can be made based on their relation to one another.

The term "node" can include a discrete data point representing specified information. Nodes may be connected to one another in a topological graph by edges, which may be assigned a value known as an edge weight in order to describe the connection strength between the two nodes. For example, a first node may be a data point representing a first device in a network, and the first node may be connected in a graph to a second node representing a second device in the network. The connection strength may be defined by an edge weight corresponding to how quickly and easily information may be transmitted between the two nodes. An edge weight may also be used to express a cost or a distance required to move from one state or node to the next. For example, a first node may be a data point representing a first position of a machine, and the first node may be connected in a graph to a second node for a second position of the machine. The edge weight may be the energy required to move from the first position to the second position.

The term "solver" can include a computational component that searches for a solution. For example, one or more solvers may be used to calculate a solution to an optimization problem. Solvers may additionally be referred to as "agents." A plurality of agents that work together to solve a given problem, such as in the case of ant colony optimization, may be referred to as a "colony."

The term "epoch" can include a period of time. For example, an epoch can be a period of time of an iteration in training a machine learning model. During training of learners in a learning algorithm, each epoch may pass after a defined set of steps have been completed. For example, in ant colony optimization, each epoch may pass after all computational agents have found solutions and have calculated the cost of their solutions. In an iterative algorithm, an epoch may include an iteration or multiple iterations of updating a model. An epoch may sometimes be referred to as a "cycle."

"Network data" can include data related to a group and/or system of interconnected people and/or things. In some embodiments, the network data can comprise a plurality of transaction data for a plurality of transactions. Each transaction data can comprise a plurality of data elements with data values. In some embodiments, at least one of the plurality of data elements comprises a user identifier for a user.

A "data element" can include a unit of data that has a precise meaning or precise semantics. A data element can include, for example, zip code, merchant identifier, user identifier, amount, IP address, date, time, etc. A data element can be associated with a data value, for example, 94016, merchant_1234, user_1234, $19.99, 111.111.11.111, 01/01/2015, 11:00 AM PT, respectively corresponding to the data elements.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "user" may include an individual. In some embodiments, a user may be associated with one or more personal accounts and/or mobile devices. The user may also be referred to as a cardholder, account holder, or consumer in some embodiments.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

An "account identifier" may include any suitable label for an account. The account identifier may be in any suitable form and may include any suitable types of characters. Examples of account identifiers include PANs (primary account numbers), tokens, verification values such as CVVs (card verification values), etc.

An "event" can include a thing that happens. In some embodiments, an event can occur at a point in time, for example, an event can include an interaction which may occur at "7:00 PM." In other embodiments, an event may occur over a span of time, for example, an event can include a concert which may take place from "7:00 PM" to "10:00 PM." An event can include a time of an interaction (e.g., a time of a transaction, accessing a secure location, transferring data between parties, etc.).

A "resource provider" may be an entity that can provide a resource. A resource can include, for example, goods, services, information, access, etc. Examples of a resource provider can include merchants, data providers such as government agencies, transit agencies, etc. A "merchant" may typically be an entity that engages in transactions and can sell goods or services, or provide access to goods or services.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device, a user device, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

"Fuzzification" can include a domain transformation where crisp values can be transformed into fuzzy values. Crisp values can be exact values measured by sensors such as temperature (e.g., 80° F.), pressure (e.g., 1 atm), rpm's (e.g., 60 rpm), etc. In some embodiments, each type of crisp input can have its own group of membership function(s) to which they are transformed. This group of membership functions may exist within a universe of discourse that holds all relevant values that the crisp input can possess.

"Crisp values" can include distinct values or inputs. In some embodiments, a crisp value can include measured parameters (e.g., 6 Volts, 12:30 PM, etc.). A crisp value can include any suitable value. For example, a crisp value can be 5, 10, 17.26, 5011, etc.

A "fuzzy value" can include a degree to which a crisp value is compatible to a membership function. For example, a fuzzy value can include a value from 0 to 1. A fuzzy value can also be referred to as a degree of membership. In some embodiments, a crisp value can be fuzzified into one or more fuzzy values. For example, a crisp value of "11:00 AM" can be transformed using two partially overlapping membership functions associated with labels of "morning" and "midday." The crisp value can be transformed to two fuzzy values, for example, a fuzzy value of 0.4 corresponding to the label of "morning" and a fuzzy value of 0.6 corresponding to the label of "midday." In some embodiments, fuzzy values can include fuzzy values for data values as well as fuzzy values for communities.

A "membership function" can define a fuzzy set by mapping crisp values from its domain to the sets associated degrees of membership.

A "label" can include descriptive name used to identify a membership function. A label can include any suitable descriptor. For example, a label can include "hot," "warm,"

"cool," "cold," "event 1," "event 2," and any other suitable descriptor which describes a fuzzy value that a crisp value may be transformed to.

A "scope" or "domain" can include a width of a membership function. For example, a scope can include a range of crisp values (e.g., 5-10) for which corresponding (e.g., via a membership function) fuzzy values are non-zero.

A "universe of discourse" can include a range of all possible values that a crisp value may include. For example, a universe of discourse corresponding to crisp values relating to "time of day" can include values from 00:00 to 23:59.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. System

According to embodiments, network data and/or derivatives thereof can be transformed, by a server computer, into fuzzy data such that the transformation removes the ability to identify data of a particular individual (i.e., user) in the network data, even when coupled with external data. Even with extensive personal data about an individual, it would be difficult for a malicious party to remap the fuzzy data to identify specific individuals. However, the fuzzy data can retain predictive power in helping to create predictive models.

FIG. 1 shows a block diagram of a system 100 according to embodiments of the invention. The system 100 comprises n resource provider computers 102, y transport computers 104, a network processing computer 106, z authorizing entity computers 108, a network data database 110, a first server computer 112, a second server computer 114, a model database 116, and an evaluation computer 118. The n resource provider computers 102 can be in operative communication with a least one of the y transport computers 104. The y transport computers 104 can be in operative communication with the network processing computer 106. The network processing computer 106 can be in operative communication with the z authorizing entity computers 108 as well as the network data database 110. The network data database 110 can be in operative communication with the first server computer 112. The first server computer 112 can be in operative communication with the network data database 110 as well as the second server computer 114 and the model database 116 which may be in operative communication with the evaluation computer 118.

The devices in FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component.

At step 1, n resource provider computers 102 can generate authorization request messages for interactions. The n resource provider computers 102 can each include a computer operated by a resource provider. In some embodiments, a resource provider computer can include a server computer. Each resource provider computer can generate an authorization request message for an interaction, during the interaction between the resource provider and a user. The resource provider computer can then transmit the authorization request message to a transport computer of the y transport computers 104. Each resource provider computer of the n resource provider computers 102 can transmit authorization request messages to different or similar transport computers of the y transport computers 104.

In some embodiments, the n resource provider computers 102 can receive the authorization request messages from access devices associated with the n resource provider computers 102, respectively. An access device can include any suitable device for providing access to an external computer system to a user, for example. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like.

At step 2, after receiving the authorization request message from one of the n resource provider computers 102, a transport computer of the y transport computers 104 can forward the authorization request message to a network processing computer 106. The y transport computers 104 can include computers and/or server computers operated by acquirers, for example.

At step 3, after receiving the authorization request message from a transport computer of the y transport computers 104, the network processing computer 106 can store the authorization request message and/or data associated therewith into a network data database 110. For example, the network processing computer 106 can store transaction data for a transaction into the network data database 110. The transaction data can include any suitable data elements, as described herein, relating to the transaction between a user and a resource provider of the originating resource provider computer. The network data database 110 can include any suitable database. The network data database 110 may be a conventional, fault tolerant, relational, scalable, secure database such as those commercially available from Oracle™ or Sybase™. The network data database 110 can store network data.

The network processing computer 106 can include any suitable server computer. The network processing computer 106 may include data processing subsystems, networks, and operations used to support and deliver authorization services, exception file services, transaction scoring services, and clearing and settlement services. An exemplary network processing computer 106 may include VisaNet™. Processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

At step 4, after storing the relevant data in the network data database 110, the network processing computer 106 can forward the authorization request message to one of z authorizing entity computers 108. The z authorizing entity computers 108 can include any suitable computers. For example, an authorizing entity computer can be configured to determine whether or not to authorize an interaction based on the authorization request message. Examples of authorizing entities can include issuers, governmental agencies, document repositories, access administrators, etc. After receiving the authorization request message, the authorizing entity computer can determine whether or not to authorize the interaction.

At step 5, after determining whether or not to authorize the interaction, the authorizing entity computer of the z authorizing entity computers 108 can generate and transmit an authorization response message to the network processing computer 106. In some embodiments, the network processing computer 106, upon receiving the authorization response message, can store the authorization response message and/or data associated therewith into the network data database 110.

At step 6, the network processing computer 106 can forward the authorization response message to the appropriate transport computer of the y transport computers 104. For example, the network processing computer 106 can determine which transport computer of the y transport computers 104 to send the authorization response message to, by evaluating a routing table and/or a data element in the authorization response message indicating the appropriate transport computer.

At step 7, after receiving the authorization response message from the network processing computer 106, the transport computer of the y transport computers 104 can transmit the authorization response message to the appropriate resource provider computer of the n resource provider computers 102, as described herein. In some embodiments, after receiving the authorization response message, the resource provider computer of the n resource provider computers 102 can notify the user of the status of the interaction. For example, the resource provider computer can notify the user via the access device of whether or not the interaction (e.g., a transaction) is authorized.

At any suitable point in time, at step 8, a first server computer 112 can query the network data database 110 for network data. Any number of interactions may have occurred prior to step 8. The network processing computer 106 can store data related to the plurality of interactions in the network data database 110. For example, the network processing computer 106 can store data related to 10, 500, 2,000, 10,000, etc. interactions into the network data database 110 prior to the first server computer 112 querying the network data database 110 for network data.

In some embodiments, the first server computer 112 can query the network data database 110 for network data associated with one or more criteria. For example, one criterion that the first server computer 112 can include in the query is a time and/or time range. For example, the first server computer 112 can query for network data that is associated with the past day, past hour, particular date range (e.g., 5/10/2019 to 5/15/2019), etc. As another example, the first server computer 112 can include a criterion that the retrieved network data include data related to interactions that occurred within a particular geographic area (e.g., North America, California, etc.). Additional example criteria can relate to user demographics, resource provider demographics, spending amount, etc.

At step 9, the network data database 110 can provide the first server computer 112 with the queried network data. The first server computer 112 can receive the network data comprising a plurality of transaction data for a plurality of transactions (e.g., 5, 28, 500, 10,000 transactions, etc.). Each transaction data can comprise a plurality of data elements (e.g., zip code, merchant identifier, user identifier, amount, IP address, date, time, etc.) with data values (e.g., 94016, merchant_1234, user_1234, $19.99, 111.111.11.111, 01/01/2015, 11:00 AM PT, respectively corresponding to the data elements). In some embodiments, at least one of the plurality of data elements can comprise a user identifier for a user. For example, the network data database 110 can provide the first server computer 112 with the transaction data as illustrated in table 1, and described in further detail below.

The first server computer 112 can then generate one or more graphs comprising a plurality of communities based on the network data. The graphs can include, for example, nodes representative of users and nodes representative of resource providers connected via edges representative of transactions. The plurality of communities can include any suitable subsets of nodes within the graph which share the same and/or similar characteristics. The first server computer 112 can determine the communities in any suitable manner as described herein.

The first server computer 112 can then determine fuzzy values for at least some of the data values for each transaction, as described in further detail herein. For example, the first server computer 112 can fuzzify the data values corresponding to the data element of time for each transaction. As an illustrative example, the first server computer 112 can determine that a data value of "11:00 AM" can correspond to fuzzy values of 0.5 for a label of "morning" and 0.5 for a label of "midday." The first server computer 112 can determine the fuzzy values based upon determined membership functions, as described in further detail herein.

For each user, the first server computer 112 can then determine fuzzy values for communities within the plurality of communities. For example, the first server computer 112 can first determine communities for a graph a plurality of times. For instance, the first server computer 112 can determine communities for a graph 3 times.

A node representative of a user may be determined to be in a first community (e.g., a sports community) two times, whereas the user may be determined to be in a second community (e.g., a literature community) one time. The first server computer 112 can determine that the user can be associated with the fuzzy values of 0.66 for the first community (e.g., the sports community) and 0.33 for the second community (e.g., literature community).

The first server computer 112 can then generate a model using the fuzzy values for the data values and the fuzzy values for the communities, and at least some of the data values. The model can include any suitable type of model, as described in further detail herein, for example, support vector machines (SVMs), artificial neural networks, decision trees, Bayesian networks, genetic algorithms, etc. In some embodiments, the model can include a mathematical description of a system or process to assist calculations and predictions (e.g., a fraud model, an anomaly detection model, etc.).

In some embodiments, at step 10, the first server computer 112 can transmit the fuzzy values for at least some of the data values for each transaction as well as the fuzzy values for the communities and/or the model to a second server computer 114 in a privacy-preserving test request message. The first server computer 112 can request the second server computer 114 to determine whether or not the fuzzy values and/or the model can be used to determine the network data used during creation of the fuzzy values and the model.

In some embodiments, the second server computer 114 can determine whether or not the fuzzy values and/or the model are privacy-preserving by determining whether or not the fuzzy values include network data which the first server computer 112 attempted to fuzzify. For example, the second server computer 114 can determine whether any of the fuzzy values are equal to a value of 1. For example, a data element of "time" can be associated with a data value of "8:00 AM." The first server computer 112 may have determined a fuzzy value of 1 for a label of "morning" for the data value of "8:00 AM." The second server computer 114 can compare the fuzzy value of 1 to a fuzzy value threshold (e.g., 0.9). The second server computer 114 can determine whether or not any of the fuzzy values exceed the fuzzy value threshold. In such a way, the second server computer 114 can catch any fuzzy values which are not privacy-preserving to the extent of the fuzzy value threshold, which may be predetermined or tuned to a specific value representative of an amount of privacy. In some embodiments, the second server computer 114 can generate a list (or other suitable data item) of fuzzy values which do not satisfy the fuzzy value threshold.

In other embodiments, the second server computer 114 can utilize external data to determine whether or not a user, or in some embodiments a resource provider, are identifiable. For example, the second server computer 114 can retrieve external data which includes user employment data (e.g., salary, work location, job title, schedule, etc.) from any suitable external data database. The second server computer 114 can determine whether or not a set of fuzzy values for a transaction can be attributed to a particular user based on the user employment data as well as the fuzzy values.

For example, the transaction data may include fuzzy values for the communities and fuzzy values for the time (e.g., events), but may not include fuzzy values for the resource provider location (e.g., street address) and stock keeping units (SKUs) for the purchased resources. The second server computer 114 can determine that the user associated with the employment data is employed in an electronics position at company X, with a work location one city block away from the resource provider location, and that the user's work day ends approximately around the fuzzy values for the time (e.g., 0.8 afternoon, 0.2 evening). The second server computer 114 can also determine that the SKUs associated with the purchased resources correspond with electronics goods. Based on the similarities between the user illustrated in the employment data and the fuzzified transaction data, the second server computer 114 can determine a percentage of overlap (e.g., 50%, 80%, 90%, etc.). The percentage of overlap can indicate how similar the user associated with the external data is to the user associated with the fuzzified transaction data. If the percentage of overlap is greater than a predetermined overlap threshold, the second server computer 114 can determine that the transaction data has not been fuzzified enough, and can communicate such information with the first server computer 112.

In some embodiments, the first server computer 112 can be capable of the same methods as the second server computer 114 and may determine whether or not the fuzzy values are privacy-preserving locally.

At step 11, after determining whether or not the fuzzy values and/or the model are privacy-preserving, the second server computer 114 can transmit a privacy-preserving test response message to the first server computer 112. The privacy-preserving test response message can include an indication of whether or not the fuzzy values and/or the model is privacy-preserving. If the second server computer 114 determines that the fuzzy values and/or the model is not privacy-preserving, then the second server computer 114 can include an indication of which values (e.g., in the fuzzy values and/or values of the network data) have not had their privacy preserved.

At step 12, after fuzzifying the network data and generating the model based thereon, the first server computer 112 can store the model in a model database 116. The model database 116 can include any suitable database. The model database 116 may be a conventional, fault tolerant, relational, scalable, secure database such as those commercially available from Oracle™ or Sybase™. The model database 116 can store one or more models.

In some embodiments, at step 13, an evaluation computer 118 can query the model database 116 for one or more models. The evaluation computer 118 can query for any suitable number of models stored in the model database 116 at any suitable point in time. The evaluation computer 118 can include an external computer which is external to the first server computer 112. For example, the evaluation computer 118 can query the model database 116 for a fraud model and a sales model.

At step 14, the model database 116 can provide the one or models to the evaluation computer 118. After receiving the one or more models, the evaluation computer 118 can run the one or more models to determine output data from each model. For example, the model can include an SVM trained on fuzzy transaction data capable of labeling input data as "fraud" or "not fraud."

In some embodiments, the evaluation computer 118 can transmit a request to the first server computer 112. The request can include request data regarding a model. For example, the evaluation computer 118 can request the first server computer 112 to run a model to determine high end electronics sales in California. After receiving the request comprising request data, the first server computer 112 can determine output data. The first server computer 112 can input the request data into the model to determine output data, output by the model.

Figure 2:
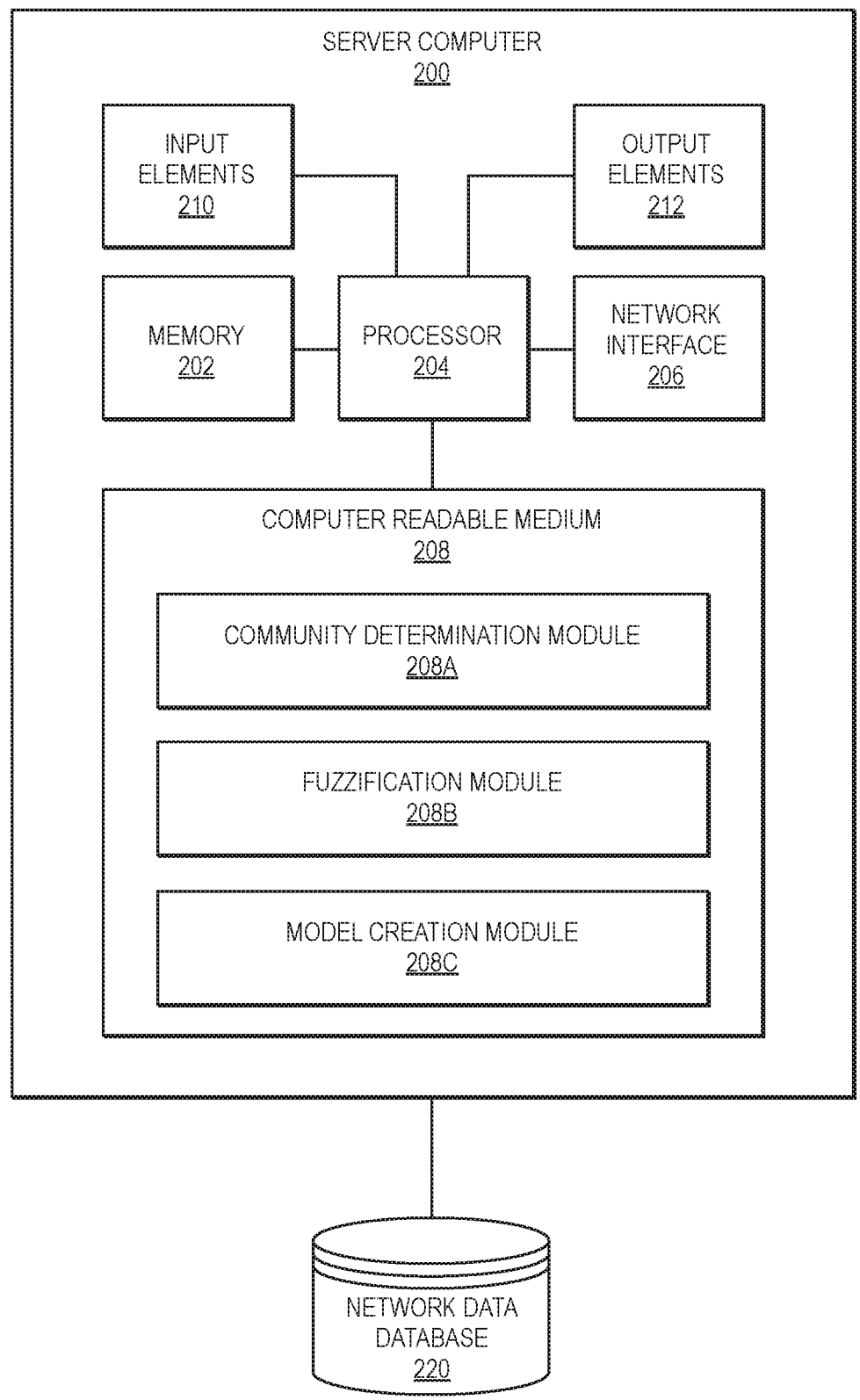
FIG. 2 shows a block diagram of components of a server computer according to embodiments.

FIG. 2 shows a block diagram of a server computer 200 according to embodiments. The exemplary server computer 200 may comprise a processor 204. The processor 204 may be coupled to a memory 202, a network interface 206, input elements 210, output elements 212, and a computer readable medium 208. The computer readable medium 208 can comprise a community determination module 208A, a fuzzification module 208B, and a model creation module 208C. The server computer 200 can be the first server computer 112 portrayed in FIG. 1.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, network data, membership functions, etc.

The input element 210 may include any suitable device capable of inputting data into the server computer 200. Examples of input devices include buttons, touchscreens, touch pads, microphones, biometric scanners etc. The one or more input elements 210 may include any suitable device(s) capable of inputting data into the server computer 200. Examples of input elements 210 include buttons, touchscreens, touch pads, microphones, etc.

The output element 212 may comprise any suitable devices that may output data. Examples of output elements 212 may include display screens, speakers, and data transmission devices. The one or more output elements 212 may comprise any suitable device(s) that may output data. Examples of output elements 212 may include display screens, speakers, and data transmission devices. For example, the output elements 212 can include a display screen capable of displaying a response value to a user of the server computer 200.

The computer readable medium 208 may comprise code, executable by the processor 204, for performing a method comprising: a) receiving, by a server computer, network data comprising a plurality of transaction data for a plurality of transactions, wherein each transaction data comprises a plurality of data elements with data values, wherein at least one of the plurality of data elements comprises a user identifier for a user; b) generating, by the server computer, one or more graphs comprising a plurality of communities based on the network data; c) determining, by the server computer, fuzzy values for at least some of the data values for each transaction of the plurality of transactions; d) for each user, determining, by the server computer, fuzzy values for communities within the plurality of communities; and e) generating, by the server computer, a model using the fuzzy values obtained in steps c) and d), and at least some of the data values.

The community determination module 208A may comprise code or software, executable by the processor 204, for determining community groups in network data. The community determination module 208A, in conjunction with the processor 204, can determine communities in any suitable manner. For example, the community determination module 208A, in conjunction with the processor 204, can group data items, for example nodes of a graph, into groups (e.g., clusters) based on how similar the nodes are to one another.

In some embodiments, the community determination module 208A, in conjunction with the processor 204, can perform an unsupervised learning algorithm which can include a graph learning process that can group nodes into dense clusters based on distance. For example, the learning process can include the following: 1) create a sorted list of edges using an edges' connectivity and overall count as a weight; 2) for each edge, generate a descending sorted collection of neighboring edges using the above defined weight as the sort by; 3) for each neighboring edge, generate the distance between the neighbor and the target edge; 4) if a distance is greater than a cut off value, then add the neighboring edge to a community; and 5) repeat until all edges are associated with a community.

Examples of suitable learning algorithms for identifying communities may include: Fastgreedy, Spinglass, Walktrap, Edge Betweenness, Infomap, Label Propagation, Optimal Modularity, and Multilevel. Furthermore, the graph learning algorithm can be an algorithm that identifies communities that overlap one another (i.e., shared nodes). For example, a graph learning algorithm typically used for identifying protein complexes based on overlapping clusters can also be used to classify nodes in any interaction network (e.g., grouping nodes of a transaction network). The graph learning algorithm may comprise computing a weight of each node in the topological graph based on the computed weights of each of the edges, and generating a queue comprising the nodes in decreasing order by weight. A seed node may be selected from the top of the queue to generate a community. Calculated interaction probabilities between nodes can then be used to add nodes to the community in an iterative manner.

The added nodes can then be removed from the queue, and the node left at the top of the queue can be used as a seed for the next community. This process can then be repeated, until the queue has been emptied, to generate a plurality of communities. Further detail regarding community group determination can be found in U.S. Pub. No. US 2019/0005407 filed on Jun. 30, 2017, which is herein incorporated by reference in its entirety for all purposes.

In other embodiments, the community determination module 208A, in conjunction with the processor 204, can generate one or more graphs comprising a plurality of communities based on the network data. The community determination module 208A, in conjunction with the processor 204, can perform community determination any suitable number of times using the network data. For example, the community determination module 208A, in conjunction with the processor 204, can determine communities for the network data 5 different times and then compare the 5 different outcomes of the community determination process. Each outcome can include a plurality of communities. In some embodiments, the community determination module 208A, in conjunction with the processor 204, can determine that a particular user, or resource provider, is included in different communities in the different graphs based on the output of the community determination process. In some embodiments, the community determination module 208A, in conjunction with the processor 204, for each different graph of the one or more graphs, can perform the community determination process with different values for parameters and/or differing threshold such that the output of each community determination process may include differing community groups.

The fuzzification module 208B can include may comprise code or software, executable by the processor 204, for fuzzifying data. The fuzzification module 208B, in conjunction with the processor 204, can determine fuzzy values for at least some of the data values for each transaction of the plurality of transactions. For example, the fuzzification module 208B, in conjunction with the processor 204, can fuzzify data values by mapping the data values to fuzzy values with one or more membership functions, as described in detail herein. For example, the fuzzification module 208B, in conjunction with the processor 204, can have the capabilities as described in, at least, section II, below.

In some embodiments, the fuzzification module 208B, in conjunction with the processor 204, can for each user, determine fuzzy values for communities within the plurality of communities. For example, the fuzzification module 208B, in conjunction with the processor 204, can determine fuzzy values which may represent a user's association with a plurality of communities. In some embodiments, the fuzzification module 208B, in conjunction with the processor 204, can represent the output of the community determination module 208B as fuzzy values. For example, a first user can be associated with a sports community during 2 of 3 community determination trials and a literature community during 1 of 3 community determination trials. The fuzzification module 208B, in conjunction with the processor 204, can convert these ratios into fuzzy values. For example, the fuzzification module 208B, in conjunction with the processor 204, can determine that the first user is associated with the sports community by a fuzzy value of 0.66 and that the first user is associated with the literature community by a fuzzy value of 0.33.

The fuzzification module 208B, in conjunction with the processor 204, can be capable of fuzzifying any suitable data values corresponding to data elements, for example, time of day, time of year, location, IP address, user identifier, resource provider identifier, amount, etc.

The model creation module 208C can include may comprise code or software, executable by the processor 204, for creating models. The model creation module 208C, in conjunction with the processor 204, can generate a model using the fuzzy values obtained by the fuzzification module 208B, in conjunction with the processor 204, and at least some of the data values, for example, ZIP code, IP address, and amount.

The model creation module 208C, in conjunction with the processor 204, can create any suitable type of model, for example, support vector machines (SVMs), artificial neural networks, decision trees, Bayesian networks, genetic algorithms, etc. In some embodiments, the model can include a mathematical description of a system or process to assist calculations and predictions (e.g., a fraud model, an anomaly detection model, etc.).

For example, the model creation module 208C, in conjunction with the processor 204, can create a model, which may be a statistical model, which can be used to predict unknown information from known information. For example, the model creation module 208C, in conjunction with the processor 204, may include a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model has been built from the model creation module 208C, in conjunction with the processor 204, model may be used to generate a predicted output from a request. For example, the request may be a request for a prediction associated with presented data. For example, the request may be a request for classifying an transaction as fraudulent or not fraudulent, or for a recommendation for a user.

The network interface 206 may include an interface that can allow the server computer 200 to communicate with external computers. The network interface 206 may enable the server computer 200 to communicate data to and from another device (e.g., a second server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

II. Fuzzification Overview

Fuzzy logic can include a form of many-valued logic in which values of variables may be any real number between 0 and 1, inclusive. By contrast, in Boolean logic, the values of variables may only be the integer values 0 or 1. During fuzzification, a crisp set of input data can be gathered and converted to a fuzzy set of values using at least membership functions. Afterwards, computations may be performed with the fuzzy values.

A. Fuzzification of Values

Fuzzification can involve a domain transformation where crisp values are transformed into fuzzy values. Crisp values can be exact values that can be measured (e.g., a voltage of 5 V, a pressure of 50 Pa, etc.). For example, in some embodiments, the crisp values can include data values from network data.

Each type of crisp value corresponding to a data element (e.g., user identifier, amount, time, location, event, community, etc.) can be processed by the system with differing groups of membership functions or sets to which they are transformed. In other words, a first data element (e.g., time) can correspond to a first set of membership functions, whereas a second data element (e.g., location) can correspond to a second set of membership functions. This group of membership functions can exist within a universe of discourse that can hold a range of values (e.g., all relevant values) that the crisp input can be. A membership function can define a fuzzy set by mapping crisp values to fuzzy values or a degree of membership of one or more labels.

Figure 3:
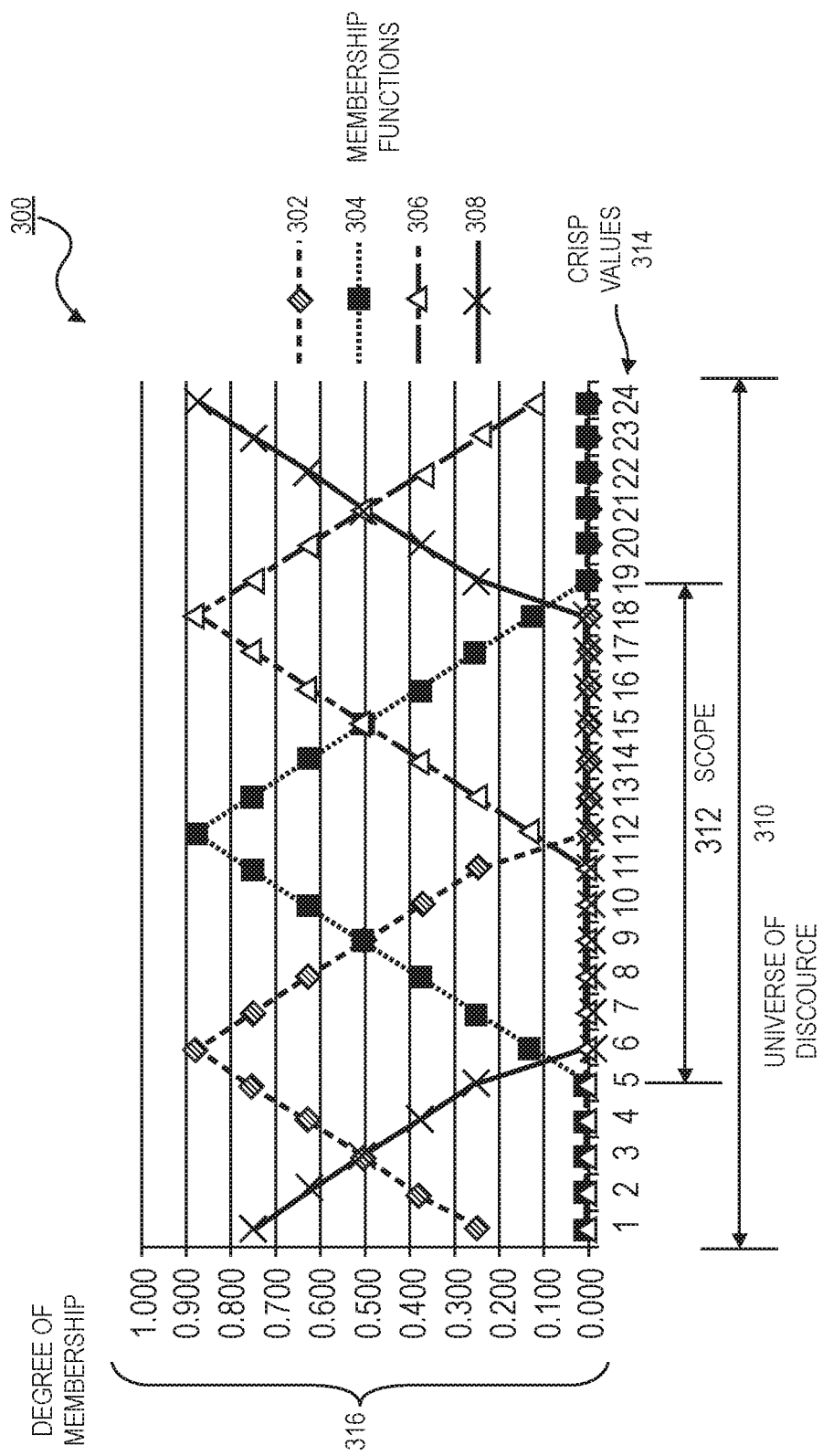
FIG. 3 shows a graph illustrating example membership functions and labels for determining fuzzy values according to embodiments.

FIG. 3 shows a graph 300 illustrating example membership functions and labels for determining fuzzy values according to embodiments. The graph 300 includes four membership functions: a first membership function 302, a second membership function 304, a third membership function 306, and a fourth membership function 308. The membership functions span a universe of discourse 310 from the crisp values of 1 to 24. Each membership function can span a scope 312 of values of which the membership function maps crisp values 314 to nonzero values of a degree of membership 316. For example, the scope 312 corresponds to the second membership function 304, and spans from the crisp value of 5 to the crisp value of 19, non-inclusive.

Each membership function can correspond to a label. The number of labels can correspond to the number of regions that the universe of discourse 310 should be divided, such that each label describes a region of behavior. A scope (e.g., the scope 312) can be assigned to each membership function that numerically identifies the range of crisp values 314 that correspond to a label.

The shape of the membership function can be representative of the variable of the crisp values 314. However, this shape is also restricted by the computing resources available. Complicated shapes require more complex descriptive equations or large lookup tables. The shape of the membership functions can include triangular functions (e.g., as shown in graph 300 of FIG. 3), trapezoidal functions, singleton functions, Gaussian functions, piecewise linear functions, etc. In some embodiments, each membership function can include a different size of scope and/or can have a different shape of function.

The number of membership functions can depend on the type of crisp values that are to be fuzzified. Too few membership functions for a given application may cause the system to yield fuzzified data that is not privacy preserving. However, too many membership functions may, for small changes in input, result in large output changes, which may cause instability in the system. Too many membership functions may adversely affect models created based on, in part, the fuzzified data.

To further provide for privacy preserving fuzzified data, the membership functions can be overlapped in scope. No overlap between membership functions reduces to a system based on Boolean logic, and thus the resulting data may be linked back to the original data by a malicious party. Each crisp value 314 on the universe of discourse 310 can belong to the scope of more than one membership functions.

As an illustrative example, during a fuzzification process, the server computer can map each crisp input 314 on the universe of discourse 310 to determine an intersection with each membership function. The server computer can determine a degree of membership 316 of each membership function that intersects with the particular crisp value.

For example, the crisp values 314 can related to a data element of "time of day." Thus, the universe of discourse 310 can encompass all times of the day (e.g., 00:00 to 23:59), however, for simplicity of illustration, the crisp values 314 portrayed in FIG. 3 include the hours 1, 2, 3, 4, . . . , 24. Each membership function can include a scope 312 that encompasses an amount of time of the day (i.e., of the universe of discourse 310). The first membership function 302 can be labeled as "01:00-12:00," the second membership function 304 can be labeled as "05:00-19:00," the third membership function 306 can be labeled as "11:00-24:00," and the fourth membership function 308 can be labeled as "18:00-6:00."

For example, an input crisp value can be 09:00 which is within the scope of the first membership function 302 and the second membership function 304. The crisp value of 09:00 can be mapped to have a degree of membership of 0.5 for the first membership function 302 and a degree of membership of 0.5 for the second membership function 304.

The fuzzy value can include any suitable data item including information regarding degree of membership(s). For example, the fuzzy value for the crisp value of 09:00 can be a tuple of (0.5, 0.5, 0, 0), where the index of elements in the tuple correspond to the membership function and/or label. In other embodiments, the fuzzy value can be included in a dictionary, for example, {"01:00-12:00":"0.5", "05:00-19:00":"0.5", "11:00-24:00":"0", "18:00-6:00":"0"}.

In some embodiments, to avoid edge conditions on some of the input values, the outputs can include fuzzy values with three or more degrees of membership. This can also reduce the ability of a malicious party to identify a particular individual by spreading the user's data across multiple membership functions. While the degrees of membership combined may remain representative of the individual.

B. Fuzzification of Communities

Figure 4:
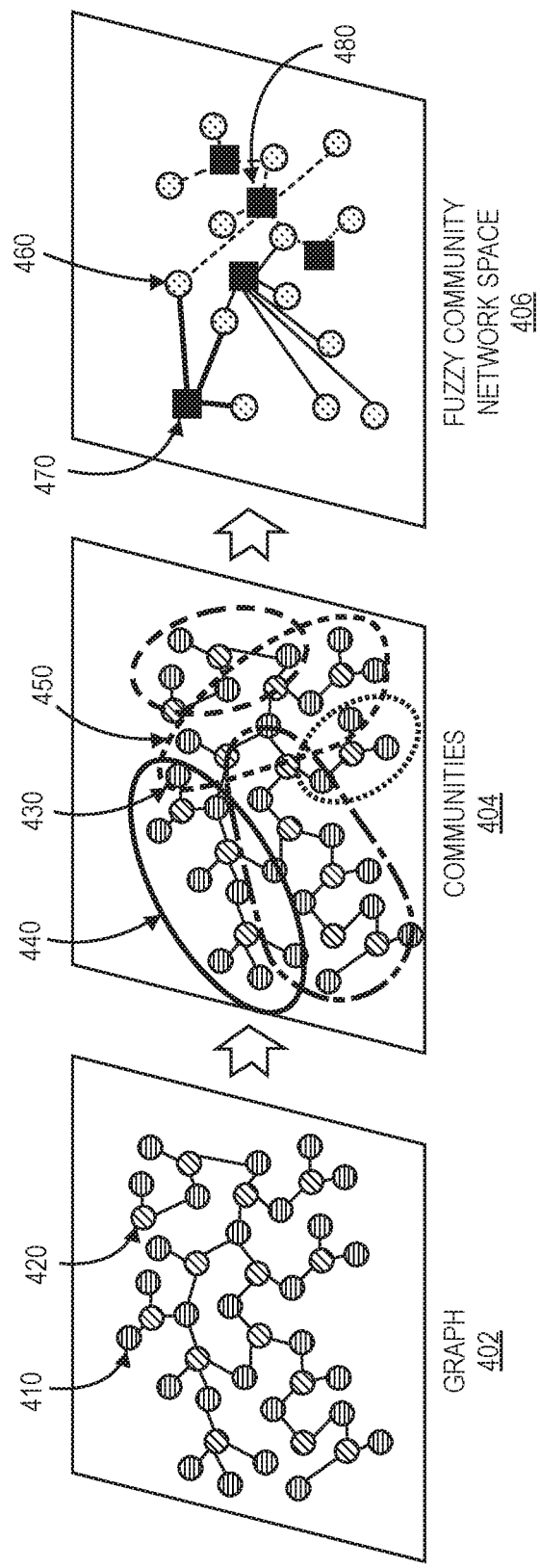
FIG. 4 shows a flow diagram of community detection and fuzzification according to embodiments.

Devices and systems, as described herein, can also be configured to fuzzify community data (e.g., community groups). FIG. 4 shows a flow diagram of community detection and fuzzification according to embodiments.

A graph 402 can be a graph generated by a server computer based on network data. The graph 402 can include nodes connected by edges. For example, the graph 402 can include user nodes 410 and resource provider nodes 420. The user nodes 410 can be connected to the resource provider nodes 420 based upon interactions (e.g., transactions) that have occurred between the associated user and resource provider.

The graph 402 can be created in any suitable manner. For example, the graph 402 can be a bipartite graph created based on a matrix of values indicating relationships between the nodes (e.g., the users and the resource providers). Such a matrix can include, for example, an incidence matrix, an adjacency matrix, etc.

The server computer can generate the graph 402 comprising a plurality of communities 404. The server computer can determine the communities 404 based on a clustering process. For example, the server computer can determine the communities 404 based on a hierarchical clustering process, a centroid-based clustering process (e.g., k-means clustering), a distribution-based clustering process, a density-based clustering process, and/or any suitable process which groups data items (e.g., nodes) into clusters based on shared and/or similar characteristics.

At least some of the nodes of the graph 402 can be included in a plurality of communities 404. The node 430 can be included in a first community 440 and a second community 450. For example, the node 430 can represent a user. Based on transaction data and any other suitable data regarding the user (e.g., salary, residence location, etc.), the server computer can determine that the user of node 430 is included in both the first community 440 (e.g., a sports community) as well as the second community 450 (e.g., a literature community).

For example, the user of node 430 may perform actions that create the association between the user and the communities, such as shopping at a sporting goods store or vising a library. The individual can be proportionally associated with these two groups. For example, if the individual shops as a sporting goods store every day, but only visits the library once a month, then the individual can be weighted to be more in the sports community, as determined from the community determination process. As such, the server computer can determine that the individual can have a weighting of 0.8 for the sports community and a weighting of 0.2 for the literature community. An individual can be associated with any suitable number of communities, for example, 5 communities, 10 communities, or any suitable number of communities.

In some embodiments, the server computer can determine community groups a plurality of times, where the community groups may or may not overlap. The server computer can determine community groups any suitable number of times. The server computer can then determine inclusion rates of each node into each community. For example, a user node may be included in the first community group 8 times and may be included in the second community group 2 times. The user node can then be associated with a fuzzy value of 0.8 for the first community group and a fuzzy value of 0.2 for the second community group.

After determining the communities 404, the server computer can generate a fuzzy community network space 406. The fuzzy community network space 406 can be a graph which includes the communities as nodes in the graph along with the nodes representing users and/or resource providers. For example, the node 460 can represent the user of node 430 associated with the first community 440 and the second community 450. In the fuzzy community network space 406, the community node 470 can be representative of the first community 440 and the community node 480 can be representative of the second community 450. The node 460 can be connected to both the community node 470 and the community node 480. The edges connecting the node 460 can be weighted by the fuzzy values for the community groups. For example, the edge between the node 460 and the community node 470 (e.g., the first community node) can be weighted by 0.8. Similarly, the edge between the node 460 and the community node 480 (e.g., the second community node) can be weighted by 0.2.

III. Methods

Embodiments can use the systems and apparatuses described herein to at least determine fuzzy values. FIGS. 4-8 describe some examples of such methods. In some embodiments, the server computer may include the first server computer 112 or the server computer 200 of FIGS. 1 and 2, respectively.

A Fuzzifying Network Data

Figure 5:
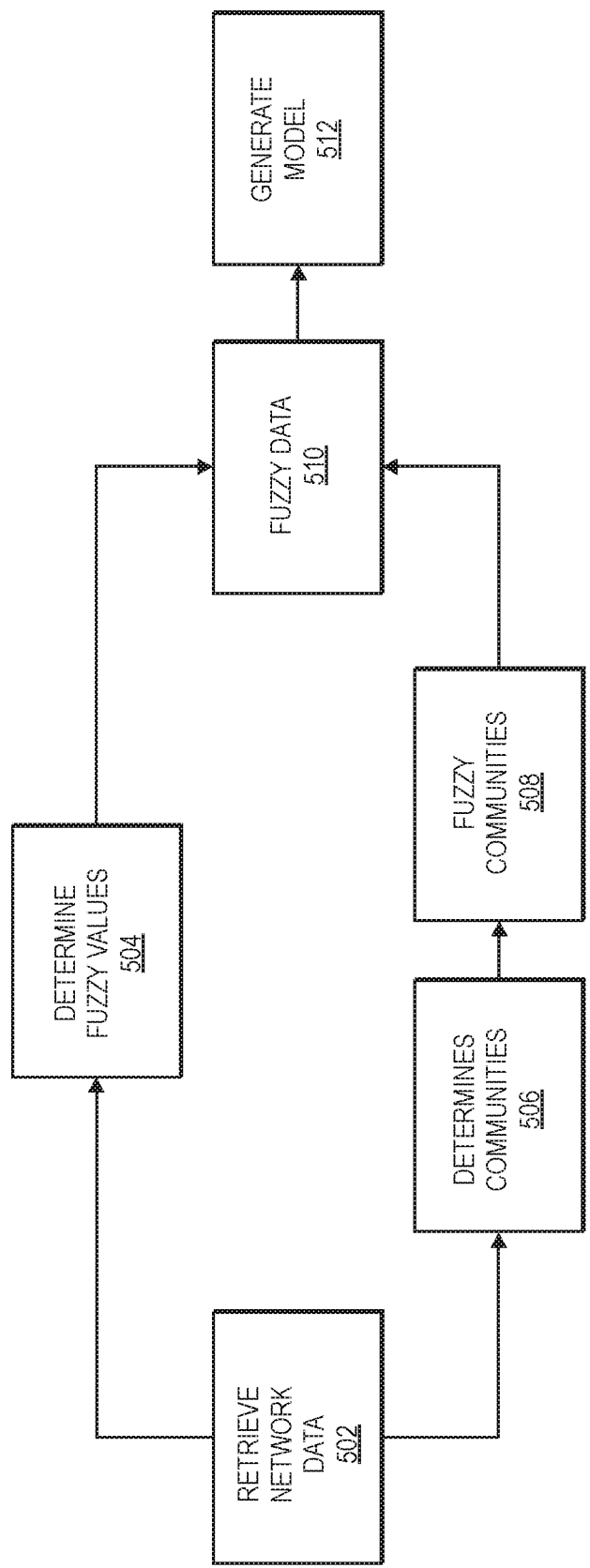
FIG. 5 shows a flow diagram of fuzzifying interaction data according to embodiments.

FIG. 5 shows a flow diagram of fuzzifying interaction data according to embodiments. The method of FIG. 5 can be performed by a server computer, as described herein. The method illustrated in FIG. 5 will be described in the context of a server computer fuzzifying interaction data and creating a model based, at least, thereon. It is understood, however, that the invention can be applied to other circumstances. For example, the server computer can fuzzify any suitable data, for example, network data comprising a plurality of transaction data.

At step 502, the server computer can retrieve network data from a suitable database. For example, the server computer can retrieve network data comprising a plurality of transaction data for a plurality of transactions. The plurality of transactions are depicted as table 1, where each row is one of the plurality of transaction data. Each transaction data can comprise a plurality of data elements with data values. For example, the data elements can include, but are not limited to, user identifier, day of year, time of day, resource provider identifier, ZIP code, IP address, and amount. Each of the data elements can be associated with a data value. For example, a data value of 1111 can be associated with a data element of user identifier. As another example, a data value of 9 can be associated with a data element of time of day. Further examples are depicted in, at least, table 1. In some embodiments, the plurality of data elements can also include SKU value(s), geographic location (e.g., address, etc.), and other data elements related to a transaction.

In some embodiments, at least one of the plurality of data elements can comprise a user identifier for a user. For example, the first column of table 1 illustrates a data element of user identifier for a plurality of transaction data, in this example, each transaction can be performed by a different user.

TABLE 1

Plurality of transaction data for a plurality of transactions

| User Identifier | Day of Year | Time of Day | Resource Provider Identifier | ZIP Code | IP Address | Amount |
|---|---|---|---|---|---|---|
| 1111 | 57 | 9 | XYZ | 123 | | 12 |
| 2222 | 59 | 12 | XYZ | | 111.111.11.111 | 100 |
| 3333 | 63 | 10 | XYZ | 123 | | 56 |
| 4444 | 57 | 15 | XYZ | 123 | | 56 |
| 5555 | 88 | 9 | XYZ | | 111.111.11.111 | 12 |
| 6666 | 89 | 8 | XYZ | | 111.111.11.111 | 98 |
| 7777 | 90 | 4 | XYZ | 123 | | 78 |
| 8888 | 110 | 13 | XYZ | | 111.111.11.111 | 23 |
| 9999 | 110 | 10 | XYZ | 123 | | 145 |
| 0000 | 120 | 12 | XYZ | 123 | | 4 |

At step 504, after retrieving the network data, the server computer can determine fuzzy values for at least some of the data values for each transaction of the plurality of transactions. For example, in some embodiments, the server computer can determine fuzzy values for at least data values corresponding to the data element of "time of day." Fuzzy values for data values corresponding to the data element of "time of day" or "day of year" can be referred to as fuzzy event values.

The server computer can determine the fuzzy event values using a plurality of membership functions. The plurality of membership functions can be capable of mapping crisp values to fuzzy values, as described herein. For example, in table 2 below, the events can include event 1, event 2, and event 3. The data values of the data element of "time of day" of the first row, corresponding to the first transaction data, can be fuzzified to be associated with event 1, event 2, and event 3. In this case, the fuzzy values can include 0.8 (i.e., 80%) associated with event 1, 0.2 with event 2, and 0 with event 3.

The server computer can determine the fuzzy event values based on the plurality of membership functions. For example, the plurality of membership functions can include three membership functions, each membership function associated with a label and a scope. The first membership function can have a label of "morning" and a scope ranging from 0 to 12 (i.e., midnight to noon). The second membership function can have a label of "midday" and a scope ranging from 6 to 18. The third membership function can have a label of "evening" and a scope ranging from 12 to 0. These membership functions are described as an illustration, however, it is understood that there may be more or less membership functions as well as larger or smaller scopes with various amounts of overlap between membership functions. For example, there may be a fourth membership function with a label of "night" and a scope of 21 to 4.

The server computer can determine that the data value of 9 (i.e., 9:00 AM) of the data element "time of day" maps to fuzzy values of 0.8 for event 1 (e.g., morning), 0.2 for event 2 (e.g., midday), and 0 for event 3 (e.g., evening).

Table 2 below, further illustrates fuzzy events for other transaction data of the plurality of transaction data. For example, the third row of table 2 shows a third transaction data comprising fuzzy event data (i.e., fuzzy values for at least some of the data values) with fuzzy event values of 0.2 for event 1, 0.6 for event 2, and 0.2 for event 3. These fuzzy event values can correspond to the time of day of 12 (i.e., noon) which can be included in the scope of the three aforementioned membership functions. The third transaction data can also comprise data values for the data elements of day of year, time of day, resource provider, ZIP code, IP address, and amount, as included in table 1.

TABLE 2

Fuzzy events

| Event 1 | Event 2 | Event 3 | Day of year | Time of day | Resource provider | ZIP code | IP address | Amount |
|---|---|---|---|---|---|---|---|---|
| 0.8 | 0.2 | 0 | 57 | 9 | XYZ | 123 | | 12 |
| 0.2 | 0.6 | 0.2 | 59 | 12 | XYZ | | 111.111.11.111 | 100 |
| 0.8 | 0.2 | 0 | 63 | 10 | XYZ | 123 | | 56 |
| 0 | 0.8 | 0.2 | 57 | 15 | XYZ | 123 | | 56 |
| 0 | 0.8 | 0.2 | 88 | 9 | XYZ | | 111.111.11.111 | 12 |
| 0 | 0.8 | 0.2 | 59 | 8 | XYZ | | 111.111.11.111 | 98 |
| 0 | 0.2 | 0.2 | 90 | 4 | XYZ | 123 | | 78 |
| 0 | 0.2 | 0.2 | 110 | 13 | XYZ | | 111.111.11.111 | 23 |
| 0 | 0.2 | 0.8 | 110 | 10 | XYZ | 123 | | 145 |
| 0 | 0.2 | 0.8 | 120 | 12 | XYZ | 123 | | 4 |

At step 506, after determining the fuzzy values for at least some of the data values, the server computer can generate one or more graphs comprising a plurality of communities based on the network data. The server computer can generate the one or more graphs comprising the plurality of communities as described herein. For example, the server computer can determine two communities that are associated with the network data. However, it is understood that the server computer may determine more than two communities. The two communities can include a "high tech" community and an "outdoor enthusiast" community. The "high tech" community can include users, and in some embodiments resource providers, associated with frequent and/or large purchases of new technology (e.g., new smart phones every 6 months). The "outdoor enthusiast" community can include users associated with purchases of camping equipment, sporting goods, etc.

At step 508, after determining the communities, the server computer can, for each user, determine fuzzy values for communities within the plurality of communities. The fuzzy values for communities can be fuzzy community values. Table 3, below, illustrates fuzzy community values.

The fuzzy community values can be fuzzified values for the communities that are associated with each transaction data. For example, the first transaction data can be associated with both community 1 by 0.1 and community 2 by 0.9. As another example, the fifth data point is associated with community 1 by 0.5 and community 2 by 0.5.

In some cases, transaction data can be associated with one or more communities, as described herein, thus the one or more communities can be said to be overlapping community groups. The overlapping community groups can be expressed as fuzzy relationships between the community groups. This relationship between the overlapping community groups can be expressed as a multiplex graph with nodes representing community groups connect via edges to the nodes representing users (e.g., as depicted the fuzzy community network space 406 of FIG. 4).

As an illustrative example, the first row in table 3, below, illustrates fuzzy community values associated with a first user (e.g., with a user identifier of "1111"). The first user can be associated with the first transaction data (i.e., the first row of table 1). The first user's transaction data history can indicate connections to both the "high tech" community (e.g., community 1) as well as the "outdoor enthusiast" community (e.g., community 2). The first user may make frequent purchases to camping equipment but may rarely purchase new phones and other technology. Due to the first user's transaction data history, the server computer can determine the first user to be associated with the "high tech" community by a fuzzy value of 0.1 and associated with the "outdoor enthusiast" community by a fuzzy value of 0.9.

In some embodiments, the server computer can perform steps 506-508 prior to determining the fuzzy values at step 504. In other embodiments, the server computer can perform steps 506-508 in parallel with step 504 as depicted in FIG. 5.

TABLE 3

Fuzzy communities

| Card number | Community 1 | Community 2 |
|---|---|---|
| 1111 | 0.1 | 0.9 |
| 2222 | 0.2 | 0.8 |
| 3333 | 0.3 | 0.7 |
| 4444 | 0.4 | 0.6 |
| 5555 | 0.5 | 0.5 |
| 6666 | 0.6 | 0.4 |
| 7777 | 0.7 | 0.3 |
| 8888 | 0.8 | 0.2 |
| 9999 | 0.9 | 0.1 |
| 0000 | 0.95 | 0.05 |

At step 510, after determining the fuzzy values for at least some of the data values for each transaction of the plurality of transactions and the fuzzy values for the communities within the plurality of communities, the server computer can determine a data table. The data table can include the fuzzy values for at least some of the data values and the fuzzy values for the communities.

In some embodiments, the server computer can determine the data table by storing the fuzzy values for at least some of the data values and the fuzzy values for the communities. For example, the server computer can include the fuzzy event data and the fuzzy community data into the transaction data. The server computer can also remove the data values that were fuzzified in step 504. For example, the server computer can remove the data element of "time of day" when determining the data table. The data table can include fuzzified data based on the fuzzy event values and the fuzzy community values, however, it is understood that the data table can include any other suitable fuzzy data, such as, but not limited to, location, zip, day of year, merchant identifier, IP address, and amount.

As an illustrative example, the data table is shown in table 4 below. The fuzzy community data for the first user including the fuzzy values of 0.1 for community 1 (e.g., the "high tech" community) and 0.9 for community 2 (e.g., the "outdoor enthusiast" community) can be included into the first transaction data of table 1. The server computer can also include the fuzzy values corresponding to the data values associated with the data element of "time of day" into the transaction data. For example, the server computer can include the values of 0.8, 0.2, and 0 associated with event 1, event 2, and event 3, respectively, into the first transaction data. Further, the server computer can remove the data value of 9 which was fuzzified from the first transaction data. In some embodiments, the server computer can also remove the user identifier from each transaction data of the plurality of transaction data.

TABLE 4

Data table

| Community 1 | Community 2 | Event 1 | Event 2 | Event 3 | Resource provider | ZIP Code | IP | Amount |
|---|---|---|---|---|---|---|---|---|
| 0.1 | 0.9 | 0.8 | 0.2 | 0 | XYZ | 123 | | 12 |
| 0.2 | 0.8 | 0.2 | 0.6 | 0.2 | XYZ | | 111.111.11.111 | 100 |
| 0.3 | 0.7 | 0.8 | 0.2 | 0 | XYZ | 123 | | 56 |
| 0.4 | 0.6 | 0 | 0.8 | 0.2 | XYZ | 123 | | 56 |
| 0.5 | 0.5 | 0 | 0.8 | 0.2 | XYZ | | 111.111.11.111 | 12 |
| 0.6 | 0.4 | 0 | 0.8 | 0.2 | XYZ | | 111.111.11.111 | 98 |
| 0.7 | 0.3 | 0 | 0.2 | 0.2 | XYZ | 123 | | 78 |
| 0.8 | 0.2 | 0 | 0.2 | 0.2 | XYZ | | 111.111.11.111 | 23 |
| 0.9 | 0.1 | 0 | 0.2 | 0.8 | XYZ | 123 | | 145 |
| 0.95 | 0.05 | 0 | 0.2 | 0.8 | XYZ | 123 | | 4 |

At step 512, after determining the data table, the server computer can generate a model using the fuzzy values obtained in steps 504 and 508, and at least some of the data values corresponding to data elements (e.g., ZIP code, IP address, amount, etc.). The model can include a statistical model, which can be used to predict unknown information from known information (e.g., the data table). For example, the data table can be used during a training process to train a model to, for example, make recommendations (e.g., a recommendation model). For example, a person may walk into a store, mid-day when it is raining. The time, midday, and the weather can be characteristics of the fuzzy space domain that this person's actions (e.g., entering the store) will be matched to. A high probability response (i.e., output) from the model using this data could be "the person needs an umbrella and a rain jacket." The output of recommending an umbrella and rain jacket to the user can be sent to an external computer.

As another example, the model can be a sales prediction model. An external computer (e.g., evaluation computer 118 of FIG. 1) can generate a request comprising request data and then transmit the request to the server computer. The request can comprise request data including, for example, a request for expected electronics sales in California during midday. After receiving the request from the external computer, the server computer can determine output data output by the model. In some embodiments, the request data may be input into the model. As an example, in reference to table 4, the server computer can determine a total amount of sales during midday (e.g., event 2) in California (e.g., ZIP code) and associated with electronics (e.g., community 1, SKU codes, etc.).

For example, the server computer can weight the amount of each transaction data using the fuzzy community values and the fuzzy event values. For example, for the first transaction, the server computer can determine a weighted amount by multiplying the high tech community (e.g., community 1) the midday event (e.g., event 2) and the amount if the other data values are representative of the request (e.g., that the ZIP code is a California ZIP code, etc.). The server computer can compute:

The value 0.24 in this example is small since the associated transaction data is slightly associated with the "high tech" community and slightly associated with the midday event. The server computer can determine the weighted amount for each transaction data of the plurality of transaction data. For the 10 rows of table 4 (e.g., 10 instances of transaction data) the server computer can determine a total weighted amount of 126.82 by adding the weighted amount for each transaction data of table 4. After determining the output data, the server computer can provide the output data to the external computer.

B. Fuzzy Membership Function Induction Via Evolutionary Learner

In some embodiments, the server computer can comprise an evolutionary learner that can determine membership functions and fuzzify data. The evolutionary learner can be any suitable evolutionary learner. One optimization technique of particular use for finding optimal and/or least costly paths within a graph can include ant colony optimization. Ant colony optimization is a method for finding optimal solutions that is similar to genetic algorithms. Both ant colony optimization and genetic algorithms utilize the probabilistic technique of simulated annealing, and both techniques are based upon ideas seen in biology. Genetic algorithms can include optimization methods that iteratively modify a set of individual proposed solutions (i.e., population) until an optimal solution is found after a number of successive iterations (i.e., generations). In such methods, information regarding a solution's accuracy (i.e., fitness) may only be communicated between agents (i.e., solvers) that are within a specific domain of the graph that is selected. This may cause such algorithms to converge to a local optimum or the quickest suitable solution, rather than the global optimum of a graph. In some instances, a genetic algorithm may be effective in locating the global optimum of a graph; however, it may take a considerably long time, as multiple generations of solutions may be required to gain insight into the entire information space as a whole.

By contrast, an ant colony optimization technique can based off of a collective hive perspective. In ant colony optimization, multiple agents can attempt to find an optimal solution, and may collectively communicate feedback (i.e., pheromones) to one another. These pheromones can be recorded and may relay information at each iteration about the effectiveness (e.g., a gradient or other error term) of their respective solution paths relative to the overall goal. The agents may be spread out amongst the entire information space and communicate with the entirety of agents (i.e., colony), thereby allowing such methods to better approach solutions that are globally optimal, despite there being a local optimum within an evaluated domain. An additional advantage of utilizing an ant colony optimization algorithm is that it may be possible to configure multiple learner goals within the algorithm. That is, a learner goal may be expressed in a number of ways. For example, one may configure the agents in the ant colony algorithm to search for a path according to signal-to-noise, shortest path, smoothest topology, etc.

1. Evolutionary Learner

Figure 6:
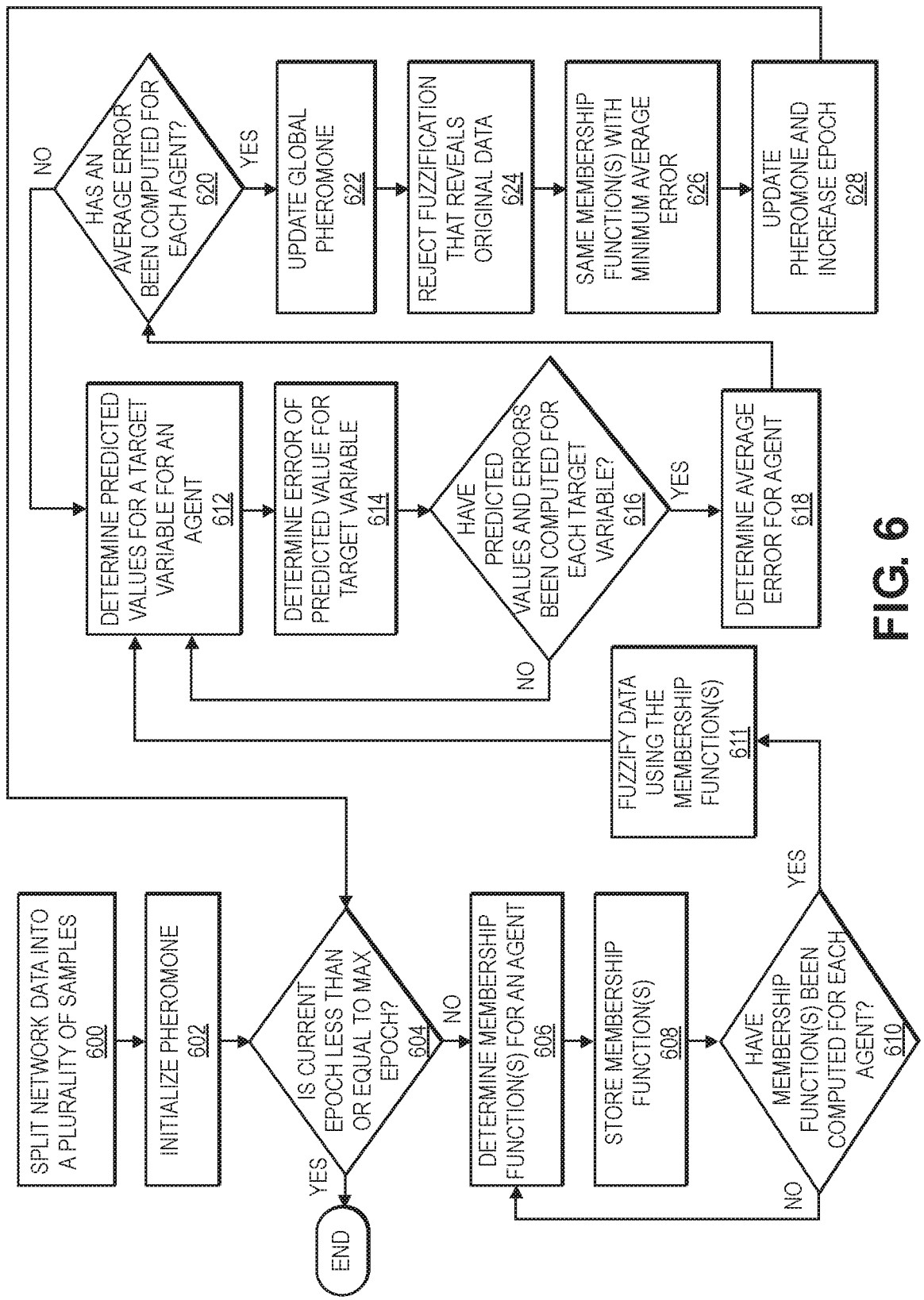
FIG. 6 shows a flowchart of an evolutionary learner data fuzzification method according to embodiments.

FIG. 6 shows a flowchart of an evolutionary learner data fuzzification method according to embodiments. The method illustrated in FIG. 6 will be described in the context of determining optimal membership functions which may then be used during data fuzzification, as described herein. It is understood, however, that embodiments can be applied to other circumstances.

Prior to step 600, the server computer can retrieve network data from a network data database. At step 600, the server computer can split the network data into a plurality of samples. For example, the network data can include a plurality of transaction data, which the server computer can split into 2, 5, 20, etc. samples, each sample including a subset of the plurality of transaction data. In some embodiments, each sample can include the same amount of transaction data (e.g., transaction data of 100 transactions). A sample can include a subset of data of the overall dataset (e.g., the network data).

At step 602, after splitting the network data into the plurality of samples, the server computer can initialize pheromone(s) for the evolutionary learner. The evolutionary learner can include, for example, a modified ant colony process. The pheromone can be a data item which facilitates with agents communicating feedback regarding optimal solutions with one another. As an example, the pheromone can contain algorithm parameters (e.g., sigmoid, sensitivity, etc.) as well as details of the membership functions (e.g., proposed split points for the membership functions, the type of membership function (e.g., triangular, trapezoidal, etc.), etc.).

At step 604, the server computer can determine whether or not the current epoch is less than a maximum epoch. The maximum epoch may be a predetermined number of iterations that the server computer can iterate through the modified ant colony process. If the server computer determines that the current epoch (e.g., epoch number 1) is less than or equal to the maximum epoch (e.g., epoch number 7), the server computer can proceed to step 606. If the server computer determines that the current epoch is greater than the final epoch, then the server computer can end the process, and the last determined membership function can include optimal membership functions.

Figure 7:
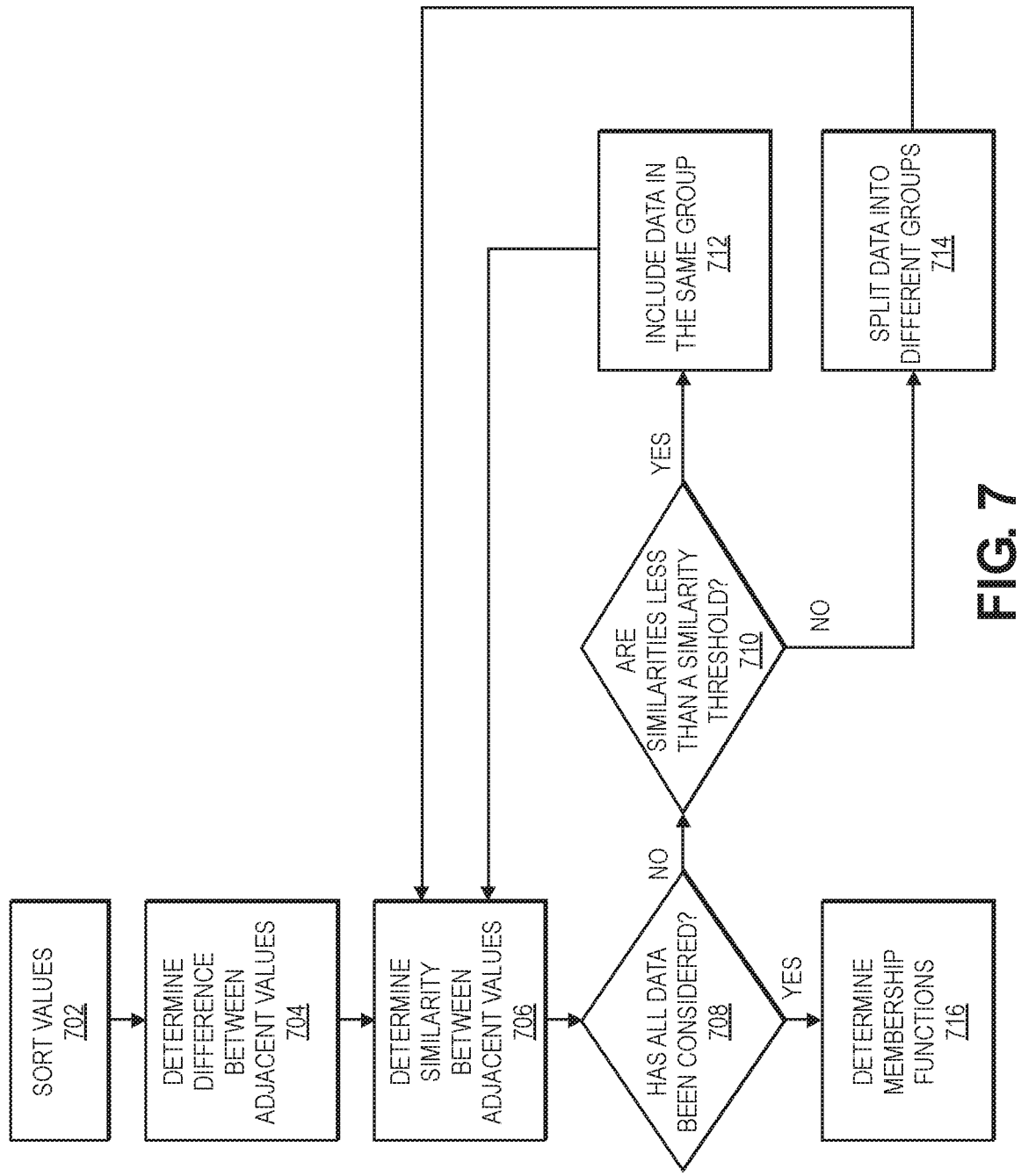
FIG. 7 shows a flowchart of a membership function determination method according to embodiments.
Figure 8:
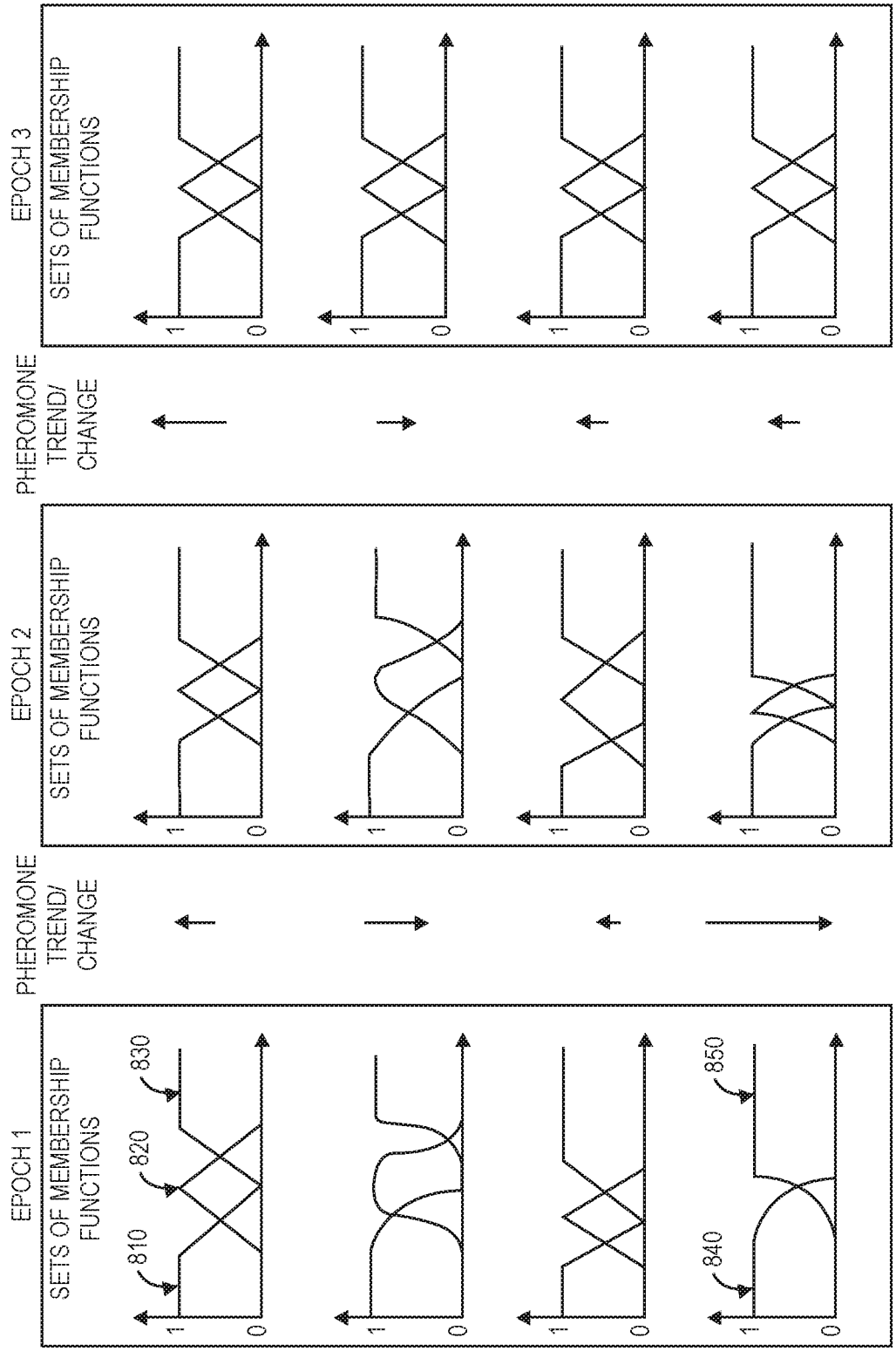
FIG. 8 shows a block diagram illustrating membership functions changing over 3 epochs of an evolutionary learner according to embodiments.

FIG. 8 will be described as an example throughout the method of FIG. 6. FIG. 8 shows a block diagram illustrating membership functions changing over 3 epochs of an evolutionary learner according to embodiments. FIG. 8 illustrates a visual depiction of the membership functions during the methods described in FIG. 6 and FIG. 7. The columns of FIG. 8 represent each epoch of FIG. 6, whereas the rows represent the different membership functions that can be determined, as described in FIG. 7, during one epoch by different agents. Over a plurality of epochs each set of membership functions can change by updating the pheromones of each agent. Overtime, each agent can converge on the same/similar membership functions which can then be used to fuzzify the network data.

In FIG. 8, four agents are illustrated for each epoch. Each agent can determine a set of membership functions which can be used to fuzzify, for example, a time of day. Over the three epochs, the agents can converge on an optimal set of membership functions which can preserve the privacy of the crisp values as well as retain the predictive power of the crisp values (e.g., for use in a model).

The first set of membership functions (of the first agent) during epoch 1 can include three membership functions. The first set of membership functions can correspond to labels relating to "time of day." For example, the first, second, and third membership functions can be labeled as morning 810, midday 820, and evening 830, respectively. As another example, the fourth set of membership functions (of the fourth agent) during epoch 1 can include two membership functions with the labels of morning 840 and evening 850. During the first epoch, the server computer can determine, as described below, that the first set of membership functions performs well (e.g., provides for fuzzy values which retain a similar amount of predictive power as the crisp values and/or provides privacy for the crisp values). The server computer can also determine that the fourth set of membership functions perform poorly (e.g., do not provide for fuzzy values which retain a similar amount of predictive power as the crisp values and/or does not provide privacy for the crisp values). During the second epoch, the server computer can avoid the sets of membership functions which performed poorly in the previous epoch(s). For example, during epoch 2, the fourth agent can determine a set of membership functions that include three membership functions rather than two membership functions, as was determined in epoch 1.

At step 606, the server computer can determine membership function(s) for an agent (i.e., an ant) of a plurality of agents. The plurality of agents can include any suitable number of agents. For example, the plurality of agents can include 3, 5, 10, 100, etc. agents. The server computer can determine the membership function(s) as further described in FIG. 7, below. For example, in some embodiments, at step 606, the server computer can perform the process of FIG. 7.

At step 608, after determining membership function(s) for an agent (e.g., a first agent) of the plurality of agents, the server computer can store the membership function(s) in association with the agent. At step 610, after storing the membership function(s) for an agent, the server computer can determine whether or not membership function(s) have been determined for each agent of the plurality of agents. If the server computer determines that membership function(s) have not yet been determined for each agent, then the server computer can repeat steps 606-608 for each agent of the plurality of agents. If the server computer determines that membership function(s) have been determined for each agent of the plurality of agents, then the server computer can proceed to step 612.

For example, during steps 606-610, the server computer can determine the membership functions of a first epoch. Epoch 1 of FIG. 8 depicts four sets of membership functions. Each set of membership function can be stored in relation to an agent. In this example, there may be 4 agents. Each set of membership functions can include different membership functions of differing scope, shape, position, etc. The following steps 611-628 can include determining the pheromone trend/change depicted in FIG. 8 between epoch 1 and epoch 2. The process may then repeat any suitable number of times (e.g., n epochs) to determine optimal membership functions, for example, the membership functions depicted in epoch 3.

At step 611, after determining the membership function(s) for each agent of the plurality of agents, the server computer can fuzzify the plurality of transaction data of the sample with the membership functions of each agent, as described herein.

At step 612, after fuzzifying the plurality of transaction data using the membership function(s) for each agent of the plurality of agents, the server computer can determine predicted values using a backward propagation neural network for a target variable of a plurality of target variables. The target variables can include fraud, total spend amount, velocity of transactions, etc. The predicted values can be predicted target variables (e.g., predicted fraud). In some embodiments, the backward propagation neural network can be used to approximate a general learner.

As an illustrative example, the server computer can predict a target variable (e.g., fraud) for the sample of transaction data using the data fuzzified with the membership function(s) of the agent. The server computer can predict fraud rates using the fuzzy transaction data.

At step 614, the server computer can determine an error between the predicted values and actual values. Actual values can include historical values corresponding to the target variables, for example, historic fraud, retrieved from a database. In some embodiments, the actual values can be determined by the server computer using the backward propagation neural network and the plurality of transaction data (non-fuzzified) to predict actual values for the target variables. The server computer can determine the error in any suitable manner. For example, in some embodiments, the server computer can determine a mean square error (MSE) for the target variable (e.g., fraud).

For example, the server computer can determine the error as follows:

$$MSE_i = 1/\text{length}(S_1)(\text{actual}-\text{predicted})^2$$

The error can represent how well the fuzzified data preserves predictive power compared to the non-fuzzified data (e.g., the network data).

At step 616, after determining the predicted values for a target variable of a plurality of target variables, the server computer can determine whether or not predicted values and error values based thereon have been determined for each target variable of the plurality of target variables. For example, the server computer can perform steps 612-614 for the target variable of fraud, then may perform steps 612-614 for the target variable total spend amount, etc. The server computer can repeat steps 612-614 for each target variable of the plurality of target variables. If the sever computer determines that predicted values and errors have been determined for each target variable for the agent, the server computer can proceed to step 618.

At step 618, after determining a plurality of predicted values and a corresponding plurality of errors for the agent of the plurality of agents, the server computer can determine an average error for the agent. For example, the average error for the agent can be determined as follows:

$$AvgMSE_j = \frac{1}{M} * \text{sum}(MSE_i)$$

At step 620, after determining the average error (i.e., $AvgMSE_j$) for an agent of the plurality of agents, the server computer can determine whether or not an average error has been determined for each agent of the plurality of agents. The server computer can repeat steps 612-618 for each agent of the plurality of agents until an average error is determined for each agent of the plurality of agents. If the server computer determines that an average error has been determined for each agent of the plurality of agents, then the server computer can proceed to step 622.

At step 622, after determining a plurality of average errors comprising an average error for each agent of the plurality of agents, the server computer can update a global pheromone. The global pheromone can include rules regarding which membership functions to avoid and which membership functions to move towards. The global pheromone can enable the plurality of agents to communicate the results (e.g., average error) of their individual pheromone. For further details regarding local and global pheromones for agents see [Bonabeau, Eric, et al. Swarm intelligence: from natural to artificial systems. No. 1. Oxford university press, 1999.].

At step 624, after updating the global pheromone, the server computer can verify anonymization of the network data. The server computer can reject any membership functions that reveal original user data from the network data. For example, the membership functions determined by a particular agent may not anonymize the user data. In this case, the server computer can verify that the resulting fuzzy data is privacy-preserving. In some embodiments, the server computer can also reject any membership functions that reveal location data (e.g., ZIP code, address, etc.), resource provider data, and/or any other suitable original data which the membership functions are meant to anonymize. For example, if a set of membership functions do not fuzzify the zip code, then the server computer can reject the set of membership functions.

In some embodiments, the server computer can reject a membership function by adjusting the average error (e.g., AvgMSE) for the agent associated with the rejected membership function.

In some embodiments, the server computer can transmit the fuzzy data to a second server computer which may comprise an adversarial AI which can determine whether or not the fuzzy data is privacy-preserving. For example, the second server computer can determine whether or not the fuzzy data is privacy-preserving similar to the server computer.

At step 626, after rejecting membership functions that are not privacy-preserving, if any are present, the server computer can save the membership function(s) that are associated with the minimum average error. For example, the minimum average error can be the smallest average error of the plurality of average errors of the plurality of agents. The membership function associated with the minimum average error can be the membership function which best maintains the accuracy of determining predicted values while anonymizing the network data during the current epoch.

At step 628, after saving the membership function(s) with the minimum average error, the server computer can update the pheromone of each agent (e.g., local pheromones) as well as increase the current epoch (e.g., increase by 1).

As an example, when updating the pheromone of an agent of the plurality of agents, the global pheromone can be used to filter out bad parametrizations. As an example, a first agent (i) may determine a bad membership function (i.e., a membership function corresponding to a large average error and/or not being privacy-preserving) as, for example, a membership function with a split at a point of x+3, whereas a second agent (j) may determine a membership function with a split at a point of x+2. When the second agent (j) updates its pheromone it can avoid (i.e., shift away from) the split point of x+3.

After updating the pheromone of each agent of the plurality of agents, the server computer can proceed to step 604 and determine whether or not the current epoch is less than or equal to the maximum epoch. If the current epoch is less than or equal to the maximum epoch, then the server computer can repeat steps 606-628, where the updated pheromones (updated at step 628) can modify the next epoch's membership functions. If the server computer determines that the current epoch is greater than the maximum epoch, then the server computer can end the process. The membership function(s) with the minimum average error, saved at step 626, can be the optimal membership function(s) determined by the server computer. The server computer can then proceed, for example, to fuzzify the network data with the membership function(s) and then generate a model based on the fuzzified data, as described herein.

As an example, in reference to FIG. 8, epoch 2 illustrates the membership functions determined at step 606 for each agent. For example, during the epoch 1, the first set of membership functions and the third set of membership functions may have had low errors, whereas the second set of membership functions and the fourth set of membership functions may have had high errors. Accordingly, the server computer can adjust the global pheromone to induce a change towards the low error set of membership functions. During epoch 2, the new sets of membership functions can be determined, in part, based on the updated global pheromone. For example, the fourth set of membership functions included two membership functions during epoch 1, however, during epoch 2 the fourth set of membership functions include three membership functions since the pheromone has been weighted towards agents having three membership functions.

During epoch 3, the four sets of membership functions may converge towards an optimal set of membership functions based on the pheromone changes from epoch 2. The server computer can then fuzzify transaction data, as described herein, using the optimal membership functions determined by the evolutionary learner.

2. Membership Function Determination

FIG. 7 shows a flowchart of a membership function determination method according to embodiments. The method illustrated in FIG. 7 will be described in the context of determining membership functions for an agent during an evolutionary learning process, such as the process described in FIG. 6. It is understood, however, that the invention can be applied to other circumstances. For further details regarding FIG. 7 and the determination of membership functions see [Hong, Tzung-Pei, and Chai-Ying Lee. "Induction of fuzzy rules and membership functions from training examples." Fuzzy sets and Systems 84.1 (1996): 33-47.], which is herein incorporated by reference in its entirety for all purposes. In this step, the output values of all training instances are appropriately grouped by applying the clustering procedure below, and appropriate membership functions for output values are derived. Our clustering procedure considers training instances with close output values as belonging to the same class with high membership values. FIG. 7 is described in further detail in [Hong, Tzung-Pei, and Chai-Ying Lee. "Induction of fuzzy rules and membership functions from training examples." Fuzzy sets and Systems 84.1 (1996): 33-47.] and will be briefly described here.

At step 702, the server computer can sort the data values of the transaction data (e.g., the data values corresponding to the data element of "time of day," "amount," etc.). The server computer can sort the data values in any suitable manner. For example, in some embodiments, the server computer can sort the data values numerically in ascending order or descending order. In other embodiments, the server computer can sort the data values based on correlation with a target variable (e.g., fraud, total spend amount, velocity of transactions, etc.).

At step 704, after sorting the data values, the server computer can determine a difference between adjacent data values. At step 706, after determining the difference between adjacent data values, the server computer can determine a similarity between adjacent data values. The adjacent data values can include the data values next to one another in a list of the sorted data values.

At steps 708-714, after determining the similarity data values between adjacent data values, the server computer can cluster the data values according to similarity. At step 708, the server computer can determine whether or not all of the data has been considered during clustering. If the server computer determines that all data has been considered, then the server computer can proceed to step 716. If the server computer determines that all of the data has not yet been considered, then the server computer can proceed to step 710.

At step 710, after determining that not all data has been considered, the server computer can determine whether or not the similarity of the adjacent values is less than a similarity threshold. The similarity threshold can include any suitable threshold. If the server computer determines that the similarity value is equal to or greater than the similarity threshold, the server computer can proceed to step 712 and include the two data points in the same group. If the server computer determines that the similarity value is less than the similarity threshold, then the server computer can proceed to step 714 and include the two data points into different groups. After steps 712 and 714, the server computer can determine the similarity between adjacent values for the next two values at step 706.

After determining that all data has been considered (e.g., clustered) at step 708, the server computer can, at step 716, determine membership functions based on the clustered data, as described in further detail in [Hong, Tzung-Pei, and Chai-Ying Lee. "Induction of fuzzy rules and membership functions from training examples." Fuzzy sets and Systems 84.1 (1996): 33-47.].

Embodiments of the invention provided for a number of advantages. For example, network data can be fuzzified in a nonreversible way such that the privacy of the network data is preserved in any models constructed using the fuzzified data. For example, users associated with transactions may not be identifiable by the fuzzified data, thus resulting in privacy-preserving data.

Embodiments of the invention provided for a number of additional advantages. For example, the fuzzification of the network data can help correct for bias in the data on coverage for one individual and location. For example, even if a user only uses a credit card, or other payment device, for a particular good (e.g., gas), by fuzzify the relationship the user's data can still help refine the model for users who use their card for everything.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
a) receiving, by a first server computer, network data comprising a plurality of transaction data for a plurality of transactions, wherein each transaction data comprises a plurality of data elements with data values, wherein at least one of the plurality of data elements comprises a user identifier for a user;
b) generating, by the first server computer, one or more graphs comprising a plurality of communities based on the network data;
c) anonymizing the network data by determining, by the first server computer, fuzzy values for at least some of the data values for each transaction of the plurality of transactions, wherein determining fuzzy values for at least some of the data values comprises:
 determining, by the first server computer, a set of membership functions for each data element corresponding to the at least some of the data values, wherein at least one membership function of the set of membership functions overlaps with a second membership function of the set of membership functions and a percentage of overlap between the at least one membership function and the second membership function is greater than a predetermined overlap threshold; and
 determining, by the first server computer, the fuzzy values for the at least some of the data values using the set of membership functions;
d) for each user, determining, by the first server computer, fuzzy values for communities within the plurality of communities;
e) transmitting, by the first server computer to a second server computer, the fuzzy values obtained in steps c) and d), wherein the second server computer is configured to return a determination that the fuzzy values obtained in steps c) and d) are privacy-preserving of the plurality of transaction data;
f) receiving, from the second server computer, a responsive message indicating at least one of the fuzzy values obtained in steps c) and d) is not privacy-preserving;
g) determining, by the first server computer, an updated set of membership functions and using the updated set of membership functions to generate updated fuzzy values for at least some of the data values;
h) generating, by the first server computer, a model using the fuzzy values obtained in step c) and the updated fuzzy values obtained in step g), and at least some of the data values; and
i) responsive to a request from an evaluation computer, providing a prediction of a fraudulent transaction to the evaluation computer based on the model generated using the anonymized network data.

2. The method of claim 1, wherein providing the prediction further comprises:
receiving, by the first server computer, the request from the evaluation computer, wherein the request comprises request data; and
determining, by the first server computer, output data output by the model, wherein the request data is input into the model and wherein the output data comprises the prediction.

3. The method of claim 1, wherein the data elements include at least one or more of the user identifier, a resource provider identifier, a day of year, a time of day, a location, an IP address, and an amount.

4. The method of claim 3, wherein the data elements include the time of day, wherein the fuzzy values for communities are fuzzy community values, and wherein the fuzzy values for at least some of the data values corresponding to the time of day are fuzzy event values.

5. The method of claim 4 further comprising:
creating, by the first server computer, a data table comprising at least the fuzzy event values and the fuzzy community values.

6. The method of claim 5, wherein creating the data table further comprises:

storing, by the first server computer, into the data table the fuzzy event values and the fuzzy community values for each transaction data of the plurality of transaction data; and removing, by the first server computer, the user identifier of each transaction data of the plurality of transaction data.

7. The method of claim 6 further comprising:
storing, by the first server computer, a subset of the plurality of data elements into the data table.

8. The method of claim 1, wherein the model is one of a support vector machine, an artificial neural network, a decision tree, a Bayesian network, and a genetic algorithm.

9. The method of claim 1, wherein the method comprises, after generating the model:
transmitting, by the first server computer to the second server computer, the model, wherein the second server computer determines whether or not external data and the model can be used to identify at least one user.

10. A first server computer comprising:
a processor;
a memory; and
a computer-readable medium coupled to the processor, the computer-readable medium comprising code executable by the processor for implementing a method comprising:
 a) receiving network data comprising a plurality of transaction data for a plurality of transactions, wherein each transaction data comprises a plurality of data elements with data values, wherein at least one of the plurality of data elements comprises a user identifier for a user;
 b) generating one or more graphs comprising a plurality of communities based on the network data;
 c) anonymizing the network data by determining fuzzy values for at least some of the data values for each transaction of the plurality of transactions, wherein determining fuzzy values for at least some of the data values comprises:
  determining, by the first server computer, a set of membership functions for each data element corresponding to the at least some of the data values, wherein at least one membership function of the set of membership functions overlaps with a second membership function of the set of membership functions and a percentage of overlap between the at least one membership function and the second membership function is greater than a predetermined overlap threshold; and
  determining, by the first server computer, the fuzzy values for the at least some of the data values using the set of membership functions;
 d) for each user, determining fuzzy values for communities within the plurality of communities;
 e) transmitting to a second server computer the fuzzy values obtained in steps c) and d), wherein the second server computer is configured to return a determination that the fuzzy values obtained in steps c) and d) are privacy-preserving of the plurality of transaction data;
 f) receiving, from the second server computer, a responsive message indicating at least one of the fuzzy values obtained in steps c) and d) is not privacy-preserving;
 g) determining an updated set of membership functions and using the updated set of membership functions to generate updated fuzzy values for at least some of the data values;
 h) generating a model using the fuzzy values obtained in step c) and the updated fuzzy values obtained in step g), and at least some of the data values; and
 i) responsive to a request from an evaluation computer, providing a prediction of a fraudulent transaction to the evaluation computer based on the model generated based on the anonymized network data.

11. The first server computer of claim 10, wherein providing the prediction to the evaluation computer further comprises:
receiving, by the first server computer, the request from the evaluation computer, wherein the request comprises request data; and
determining, by the first server computer, output data output by the model, wherein the request data is input into the model and wherein the output data comprises the prediction.

12. The first server computer of claim 10, wherein the data elements include at least one of the user identifier, a resource provider identifier, a day of year, a time of day, a location, an IP address, and an amount.

13. The first server computer of claim 12, wherein the data elements include the time of day, wherein the fuzzy values for communities are fuzzy community values, and wherein the fuzzy values for at least some of the data values corresponding to the time of day are fuzzy event values.

14. The first server computer of claim 13, wherein the method further comprises:
creating a data table comprising at least the fuzzy event values and the fuzzy community values.

15. The first server computer of claim 14, wherein creating the data table further comprises:
storing into the data table the fuzzy event values and the fuzzy community values for each transaction data of the plurality of transaction data; and
removing, by the first server computer, the user identifier of each transaction data of the plurality of transaction data.

16. The first server computer of claim 15 further comprising:
storing a subset of the plurality of data elements into the data table.

17. The first server computer of claim 10, wherein the model is one of a support vector machine, an artificial neural network, a decision tree, a Bayesian network, and a genetic algorithm.

18. The first server computer of claim 10, wherein the method further comprises after generating the model:
transmitting, by the first server computer to the second server computer, the model, wherein the second server computer determines whether or not external data and the model can be used to identify at least one user.

* * * * *